(12) United States Patent
King

(10) Patent No.: US 12,305,670 B2
(45) Date of Patent: May 20, 2025

(54) SUBMERSIBLE HYDRAULIC POWER UNITS WITH INTERCHANGEABLE MANIFOLDS

(71) Applicant: KTI Hydraulics Inc., Santa Ana, CA (US)

(72) Inventor: Chun Nien King, Irvine, CA (US)

(73) Assignee: KTI Hydraulics Inc., Tustin, CA (US)

( * ) Notice: Subject to any disclaimer, the term of this patent is extended or adjusted under 35 U.S.C. 154(b) by 603 days.

(21) Appl. No.: 17/392,816

(22) Filed: Aug. 3, 2021

(65) Prior Publication Data

US 2023/0040307 A1 Feb. 9, 2023

(51) Int. Cl.
| | |
|---|---|
| F15B 1/26 | (2006.01) |
| B60P 1/16 | (2006.01) |
| F04B 17/03 | (2006.01) |
| F04B 23/02 | (2006.01) |
| F04B 53/16 | (2006.01) |
| F15B 15/18 | (2006.01) |
| F15B 21/00 | (2006.01) |

(52) U.S. Cl.
CPC ............... *F15B 1/26* (2013.01); *F04B 17/03* (2013.01); *F04B 23/02* (2013.01); *F04B 23/021* (2013.01); *F04B 53/16* (2013.01); *F15B 15/18* (2013.01); *F15B 21/008* (2013.01); *B60P 1/162* (2013.01); *F15B 2211/20515* (2013.01); *F15B 2211/7053* (2013.01)

(58) Field of Classification Search
CPC .. F15B 15/18; F15B 2211/20515; F15B 1/26; F15B 2211/7053; F04B 17/03; F04B 23/021; F04B 23/02; F04B 53/16; B60P 1/162

See application file for complete search history.

(56) References Cited

U.S. PATENT DOCUMENTS

| | | |
|---|---|---|
| 1,970,484 A | 8/1934 | Arutunoff et al. |
| 4,861,239 A | 8/1989 | Simmons et al. |
| 5,078,236 A | 1/1992 | Shimoaki et al. |
| 5,109,672 A | 5/1992 | Chenoweth et al. |
| 5,348,125 A | 9/1994 | Stribling |
| 5,385,453 A | 1/1995 | Fogt et al. |

(Continued)

FOREIGN PATENT DOCUMENTS

| | | |
|---|---|---|
| DE | 19612582 A1 | 10/1997 |
| DE | 202005005620 U1 | 8/2006 |

(Continued)

*Primary Examiner* — Peter J Bertheaud
(74) *Attorney, Agent, or Firm* — Chong IP Law Group

(57) ABSTRACT

Submersible hydraulic power units with interchangeable manifolds for hydraulic systems are provided. In one embodiment, submersible hydraulic power unit ("SHPU") for moving hydraulic fluid between a first chamber and a second chamber of a hydraulic device is provided, the SHPU comprising: a tank for storing hydraulic fluid, wherein the tank houses: a motor submerged in the hydraulic fluid, the motor having a powered on and a powered off configuration based on at least one command signal; and a pump submerged in the hydraulic fluid and connected to the motor, wherein the motor drives the pump to route the hydraulic fluid in and out of the tank; and a lid attached to the tank, wherein the lid comprises at least one opening allowing an interchangeable manifold to connect to the pump.

14 Claims, 30 Drawing Sheets

(56) References Cited

U.S. PATENT DOCUMENTS

| | | | |
|---|---|---|---|
| 5,988,989 A * | 11/1999 | Hobson | F04B 17/03 417/299 |
| 6,029,448 A | 2/2000 | Hobson | |
| 6,290,474 B1 | 9/2001 | Bavendiek et al. | |
| 2006/0228235 A1 | 10/2006 | Neumair et al. | |
| 2014/0169997 A1 | 6/2014 | Ibatici | |
| 2017/0089369 A1 | 3/2017 | Wunch et al. | |
| 2021/0180577 A1* | 6/2021 | King | F04B 23/021 |

FOREIGN PATENT DOCUMENTS

| | | |
|---|---|---|
| EP | 1081083 A2 | 3/2001 |
| JP | H06191297 A | 7/1994 |
| JP | H0687677 U | 12/1994 |
| WO | 2017/077060 A1 | 5/2017 |

\* cited by examiner

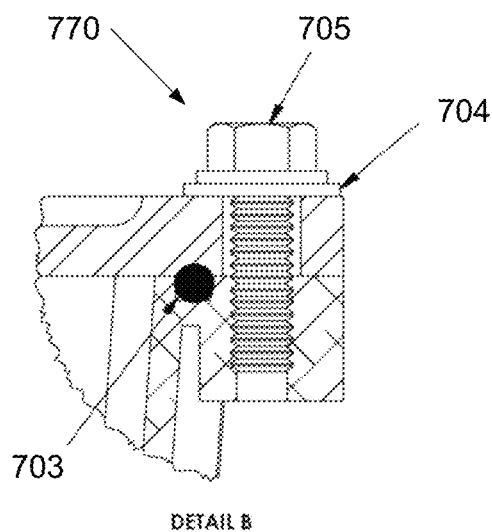
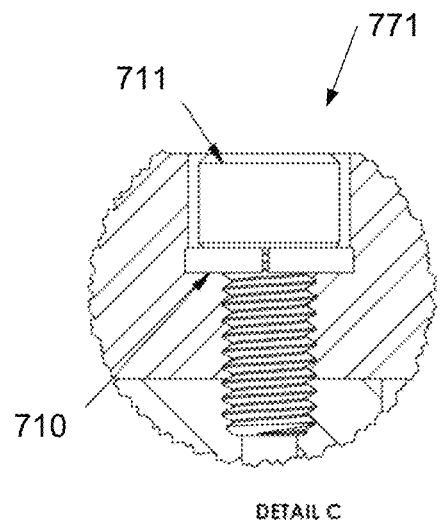
FIG. 7G                     FIG. 7H
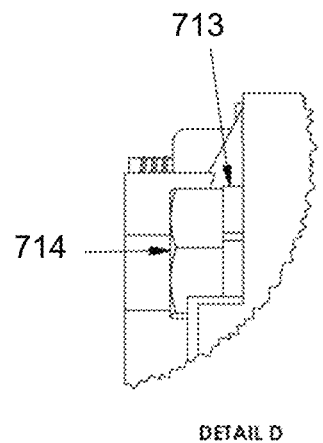
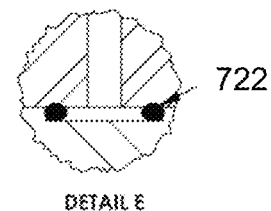
FIG. 7I                     FIG. 7J

SUBMERSIBLE HYDRAULIC POWER UNITS WITH INTERCHANGEABLE MANIFOLDS

FIELD OF THE INVENTION

The present invention generally relates to hydraulics and more specifically to submersible hydraulic power units with interchangeable manifolds.

BACKGROUND

Hydraulics is a technology that includes the use of liquids (e.g., hydraulic fluid) in the application of mechanical properties. At its core, hydraulics may be used for the generation, control, and transmission of power by the use of pressurized hydraulic fluids. Typically, hydraulic fluid is the medium by which power is transferred in hydraulic devices and/or systems. Common hydraulic fluids may be based on mineral oil or water. In practice, hydraulic devices and/or systems may be central parts of various technologies, such as, but not limited to, hydraulic brakes, power steering systems, aircraft flight control systems, lifts, dump trucks, and various other machineries.

SUMMARY OF THE INVENTION

The various embodiments of the present submersible hydraulic power units (may be referred to as "SHPUs") with interchangeable manifolds contain several features, no single one of which is solely responsible for their desirable attributes. Without limiting the scope of the present embodiments, their more prominent features will now be discussed below. In particular, the present SHPUs with interchangeable manifolds will be discussed in the context of a truck bed equipped with a hydraulic lift (may also be referred to as "dump truck") or a dump trailer. However, the use of a dump truck/dump trailer is merely exemplary, and the present SHPUs with interchangeable manifolds may be utilized for a variety of hydraulic applications as appropriate to the requirements of a specific hydraulic device and/or system in accordance with various embodiments of the invention. For example, the dump truck/dump trailer may be configured as a double-acting hydraulic system and the discussion below may utilize an SHPU with a double-acting manifold. However, the use of an SHPU with a double-acting manifold is merely and the manifold may be interchanged. For example, in addition to double-acting manifolds, SHPUs may utilize a single-acting manifold, a single/double-acting manifold, a double double-acting manifold, a double single-acting manifold, etc. After considering this discussion, and particularly after reading the section entitled "Detailed Description," one will understand how the features of the present embodiments provide the advantages described here.

One aspect of the present embodiments includes the realization that in current hydraulic power units ("HPUs") other than the present embodiments, hydraulic fluid may only be used for operating the attached hydraulic device without taking advantage of the hydraulic fluids' various properties (e.g., thermal cooling, noise canceling, shielding, etc.). For example, in current HPUs other than the present embodiments, a motor and/or a pump may be exposed to the elements resulting in degradation and/or damage from lacking a protective shield. Further, the motor and/or the pump may produce unwanted noise. In addition, since the motor, pump, and/or the tank (may also be referred to as "reservoir") are separate discrete components, the HPU may take up valuable space. The present embodiments solve these problems by providing an SHPU with a tank containing hydraulic fluid and configured to house, within the tank, a motor and a pump submerged in the hydraulic fluid. The present embodiments thus advantageously enable the motor to be submerged in the hydraulic fluid, thereby protecting the motor from moisture and foreign contaminates. In addition, since the motor is submerged in the hydraulic fluid and enclosed in the tank, the noise produced may be significantly reduced. Moreover, SHPUs with interchangeable manifolds may operate at a more constant and lower temperature due to the heat transfer/cooling properties of the hydraulic fluid. Further, the size of the HPU may be significantly reduced (e.g., by 50% or more) as the motor and/or pump are contained within the tank.

Another aspect of the present embodiments including the realization that in current HPUs other than the present embodiments, a HPU is built for a specific hydraulic system and cannot be utilized for other types of hydraulic systems. For example, in current HPUs other than the present embodiments, a HPU built for a single-acting hydraulic system cannot be utilized for a double-acting hydraulic system. The present embodiments solve these problems by providing an SHPU with interchangeable manifolds thereby allowing SHPUs to be configured by the user to the needs of a plurality of hydraulic systems. The present embodiments provide these advantages and enhancements, as described below.

In a first aspect, a submersible hydraulic power unit ("SHPU") for moving hydraulic fluid between a first chamber and a second chamber of a hydraulic device is provided, the SHPU comprising: a tank for storing hydraulic fluid, wherein the tank houses: a motor submerged in the hydraulic fluid, the motor having a powered on and a powered off configuration based on at least one command signal; and a pump submerged in the hydraulic fluid and connected to the motor, wherein the motor drives the pump to route the hydraulic fluid in and out of the tank; and a lid attached to the tank, wherein the lid comprises at least one opening allowing an interchangeable manifold to connect to the pump.

In an embodiment of the first aspect, the interchangeable manifold is exterior to the tank.

In another embodiment of the first aspect, the lid further comprises at least one manifold connection point for attaching the interchangeable manifold to the lid.

In another embodiment of the first aspect, the lid further comprises at least one opening allowing a start solenoid to connect to the motor.

In another embodiment of the first aspect, the start solenoid is exterior to the tank.

In another embodiment of the first aspect, the start solenoid is connected to the interchangeable manifold.

In another embodiment of the first aspect, the start solenoid is connected to a power source.

In another embodiment of the first aspect, the start solenoid is connected to an input device for receiving the at least one command signal.

In another embodiment of the first aspect, the input device is wirelessly connected to the SHPU.

In another embodiment of the first aspect, the motor is connected to a power source exterior to the tank.

In another embodiment of the first aspect, the motor is a direct current (DC) motor.

In another embodiment of the first aspect, the motor is an alternating current (AC) motor.

In another embodiment of the first aspect, the hydraulic fluid absorbs waste heat produced by the motor.

In another embodiment of the first aspect, the hydraulic fluid absorbs noise produced by the motor.

In another embodiment of the first aspect, the lid is removable from the tank.

In another embodiment of the first aspect, the interchangeable manifold is a single-acting manifold.

In another embodiment of the first aspect, the interchangeable manifold is a double-acting manifold.

In another embodiment of the first aspect, the interchangeable manifold is a single/double acting manifold.

In another embodiment of the first aspect, the interchangeable manifold is a double single-acting manifold.

In another embodiment of the first aspect, the interchangeable manifold is a double double-acting manifold.

BRIEF DESCRIPTION OF THE DRAWINGS

The various embodiments of the present SHPUs with interchangeable manifolds now will be discussed in detail with an emphasis on highlighting the advantageous features. These embodiments depict the novel and non-obvious SHPUs with interchangeable manifolds shown in the accompanying drawings, which are for illustrative purposes only. These drawings include the following figures:

FIG. 7G is a schematic diagram illustrating a close up of Detail B of FIG. 7F in accordance with an embodiment of the invention.

FIG. 7H is a schematic diagram illustrating a close up of Detail C of FIG. 7F in accordance with an embodiment of the invention.

FIG. 7I is a schematic diagram illustrating a close up of Detail D of FIG. 7D in accordance with an embodiment of the invention.

FIG. 7J is a schematic diagram illustrating a close up of Detail E of FIG. 7F in accordance with an embodiment of the invention.

DETAILED DESCRIPTION OF THE DRAWINGS

Figure 1:
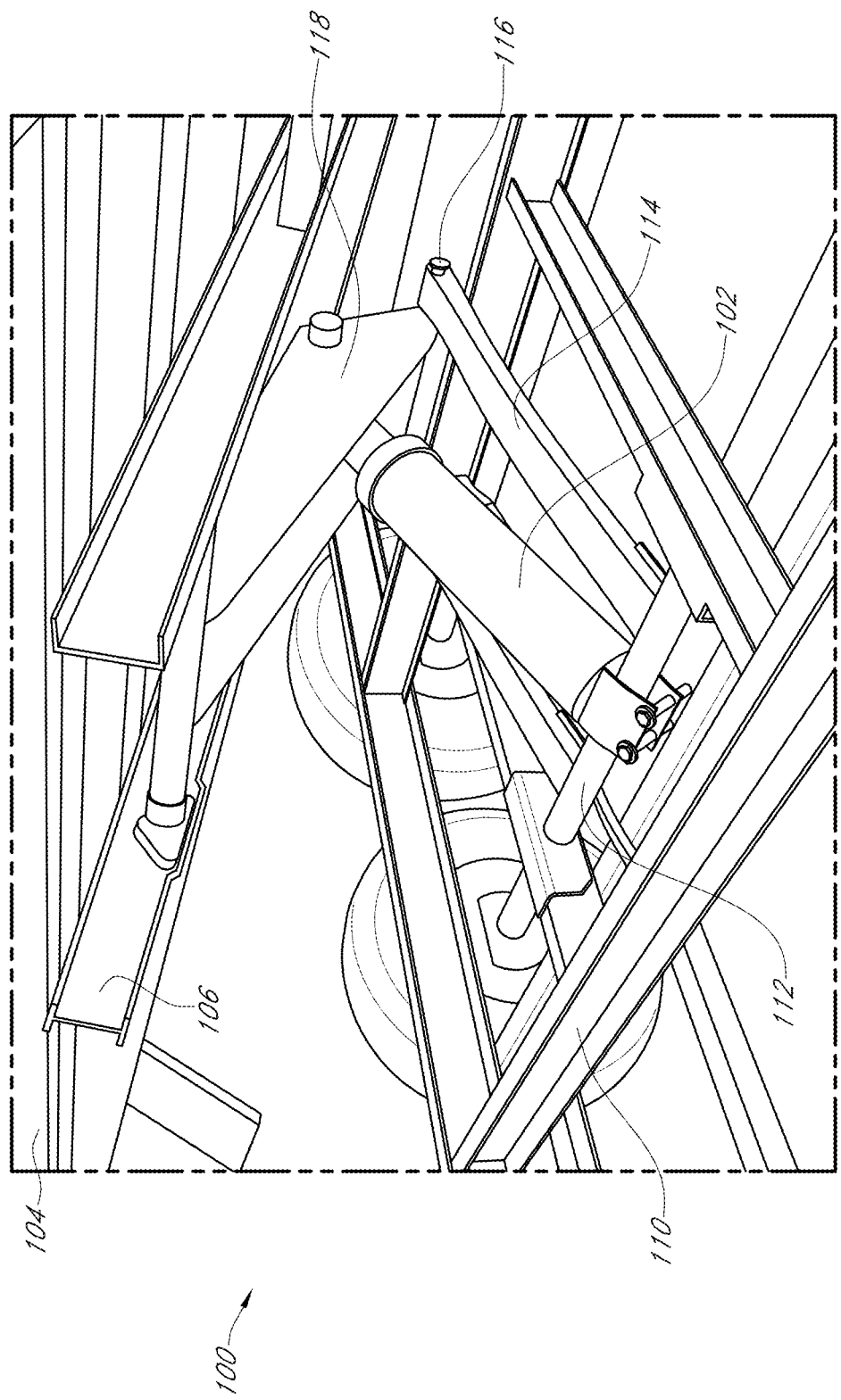
FIG. 1 illustrates a dump truck utilizing a dual-acting hydraulic cylinder (may also be referred to as "hydraulic cylinder" or "cylinder") for lifting a truck bed in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, SHPUs with interchangeable manifolds (may also be referred to collectively as "SHPUs") in accordance with embodiments of the invention are disclosed. In many embodiments, SHPUs with interchangeable manifolds may be connected to one or more hydraulic devices, such as, but not limited to, a double-acting hydraulic cylinder. In various embodiments, the SHPUs with interchangeable manifolds may be part of a larger hydraulic system. In many embodiments, SHPUs with interchangeable manifolds may include a tank for holding hydraulic fluid and configured to house a motor and/or a pump submerged in the hydraulic fluid. In many embodiments, the motor may power the pump for regulating fluid flow between various components in the hydraulic system, as further described below. In some embodiments, the motor may be a direct current (DC) motor. In some embodiments, the motor may be an alternating current (AC) motor. In various embodiments, the SHPUs may also include an interchangeable manifold having ports to connect to the hydraulic device (e.g., hydraulic cylinder), as further described below. In some embodiments, the interchangeable manifold may be exterior to the tank. As described further below, the interchangeable manifold may be a single-acting manifold, a double-acting manifold, a single/double-acting manifold, a double double-acting manifold, a double single-acting manifold, etc.

Further, the SHPU may include a lid attached to the tank, wherein the lid includes at least one opening allowing the interchangeable manifold to connect to the pump. In some embodiments, the lid may also include at least one manifold connection points for attaching (and detaching) the interchangeable manifold to the lid. In some embodiments, the lid may also include at least one opening that allows a start solenoid switch (may also be referred to as "start solenoid") to connect to the motor located within the tank of the SHPU. In many embodiments, the start solenoid may be connected to a power source. For example, the SHPU may also include a power source, such as, but not limited to, a battery, that may provide power to the motor and/or the start solenoid. In some embodiments, the SHPU may be connected to an input device that provides at least one command signal to the SHPU, as further described below. For example, the start solenoid may be connected to the input device. In various embodiments, the start solenoid and the interchangeable manifold may be connected by one or more connectors, as further described below. Hydraulic systems utilizing hydraulic cylinders in accordance with embodiments of the invention are further discussed below.

Dump Trucks with Double-Acting Hydraulic Cylinders

A variety of systems may use hydraulic cylinders to provide a directional force using pressurized hydraulic fluid (may also be referred to as "fluid"). Typically, a hydraulic cylinder may include a cylinder barrel in which a piston is connected to a piston rod that may move back and forth as the piston moves back and forth within the cylinder barrel. By connecting the piston rod to an external structure, the force generated by the pressurized hydraulic fluid may be applied to the external structure. In double-acting hydraulic cylinders, the cylinder barrel may include a first chamber (may also be referred to as a "blind end") and a second chamber (may also be referred to as "rod end") separated by the piston, where the first chamber may have a first pressure level and the second chamber may have a second pressure level. As further described below, the first and second chambers may be connected by an SHPU with an interchangeable manifold (e.g., a double-acting manifold) configured to move the hydraulic fluid between the first and second chambers.

A dump truck utilizing a hydraulic cylinder for lifting a truck bed in accordance with an embodiment of the invention is illustrated in FIG. 1. The dump truck 100 may include a double-acting hydraulic cylinder 102 for lifting a truck bed 104. The dump truck 100 may also include a frame 110 having a bar 112 that connects to one side of the hydraulic cylinder 102 (e.g., the blind end). One of ordinary skill in the art would recognize that a direct push and/or a scissor hoist are two common methods of raising the truck bed (shown in FIG. 1 is a scissor hoist). In addition, the truck bed 104 may be connected to a frame 106 that attaches to a lift arm having a first portion 114, a joint 116, and a second portion 118. In various embodiments, a piston rod may extend from a rod end of the hydraulic cylinder 102 and connect to the second portion 118 of the lift arm. In several embodiments, the lift arm may be configured to receive force from the hydraulic cylinder 102 via the piston rod to raise or lower the truck bed 104, as further described below.

As described above, a double-acting hydraulic cylinder may have two chambers (e.g., a first chamber and a second chamber) that may be connected by an SHPU with an interchangeable manifold (e.g., a double-acting manifold)

for moving hydraulic fluid between the two chambers for raising and/or lowering the truck bed 104. For example, the first chamber may have a first port (may also be referred to as "bottom port") that connects to a corresponding first port of the interchangeable manifold (e.g., a double-acting manifold) of the SHPU (may also be referred to as "A port") for allowing the hydraulic fluid to enter and exit the first chamber. Further, the second chamber may include a second port (may also be referred to as "top port") that connects to a corresponding second port of the interchangeable manifold (e.g., a double-acting manifold) of the SHPU (may also be referred to as "B port") for allowing the hydraulic fluid to enter and exit the second chamber.

Figure 2A:
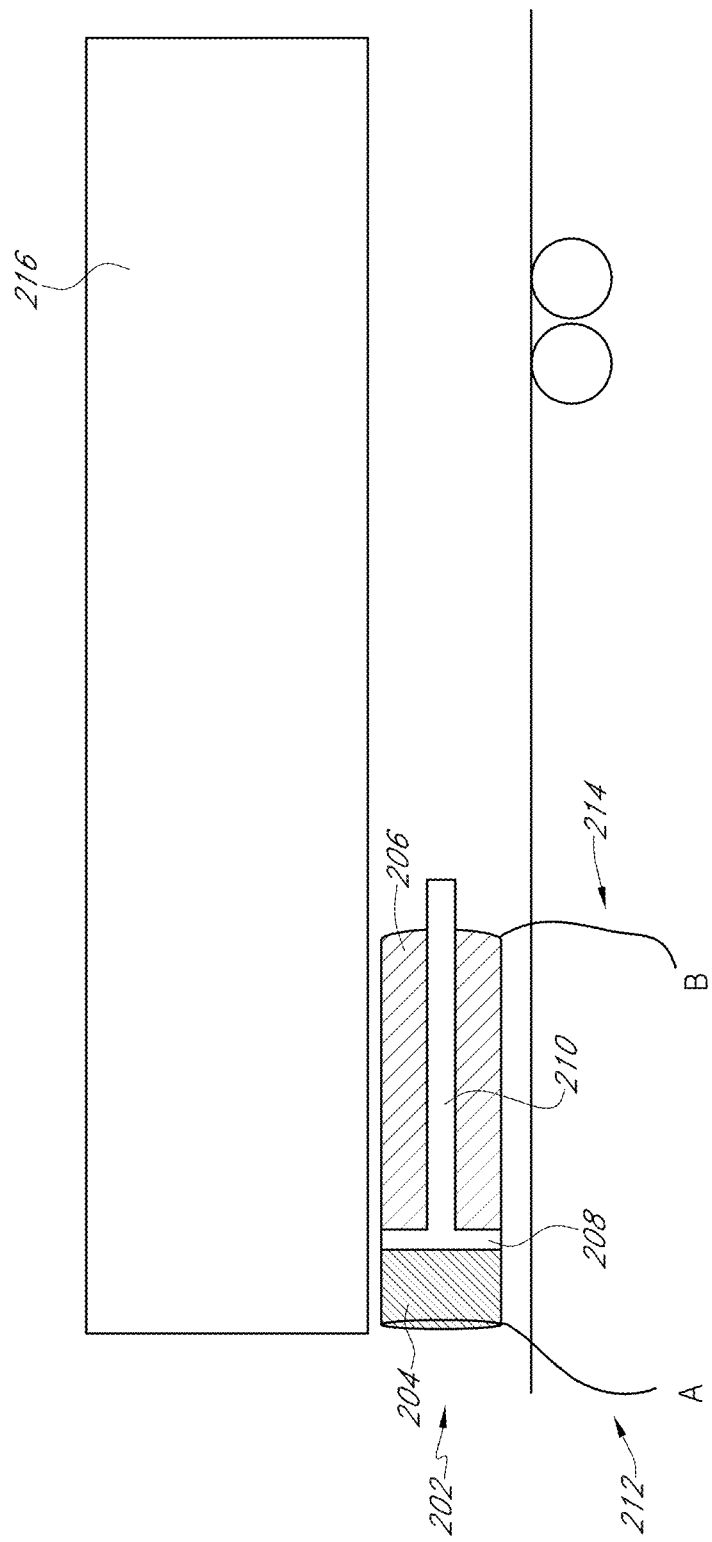
FIGS. 2A-C illustrate a hydraulic cylinder in various states relative to positions of a truck bed in accordance with an embodiment of the invention.
Figure 2B:
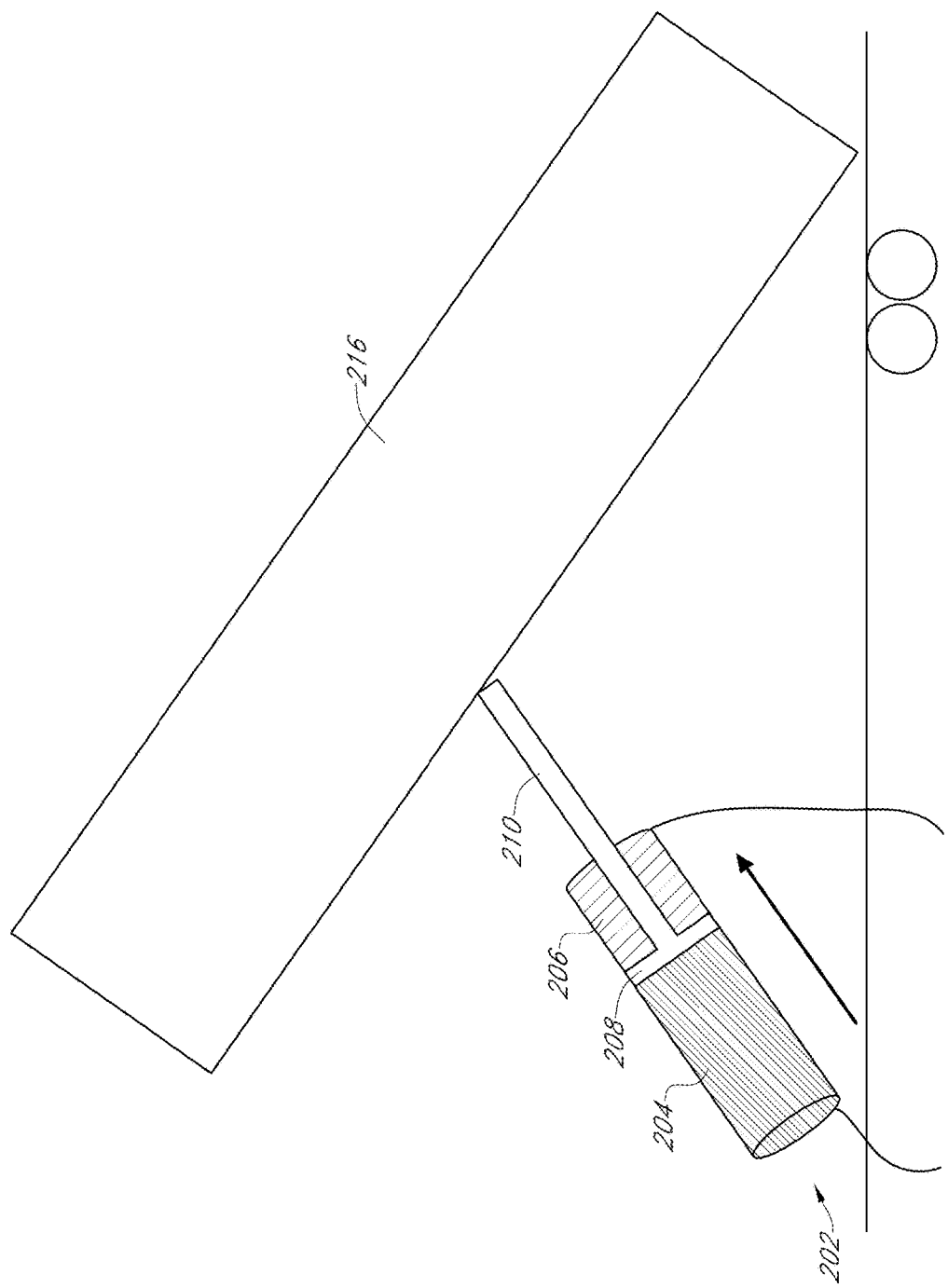
Figure 2C:
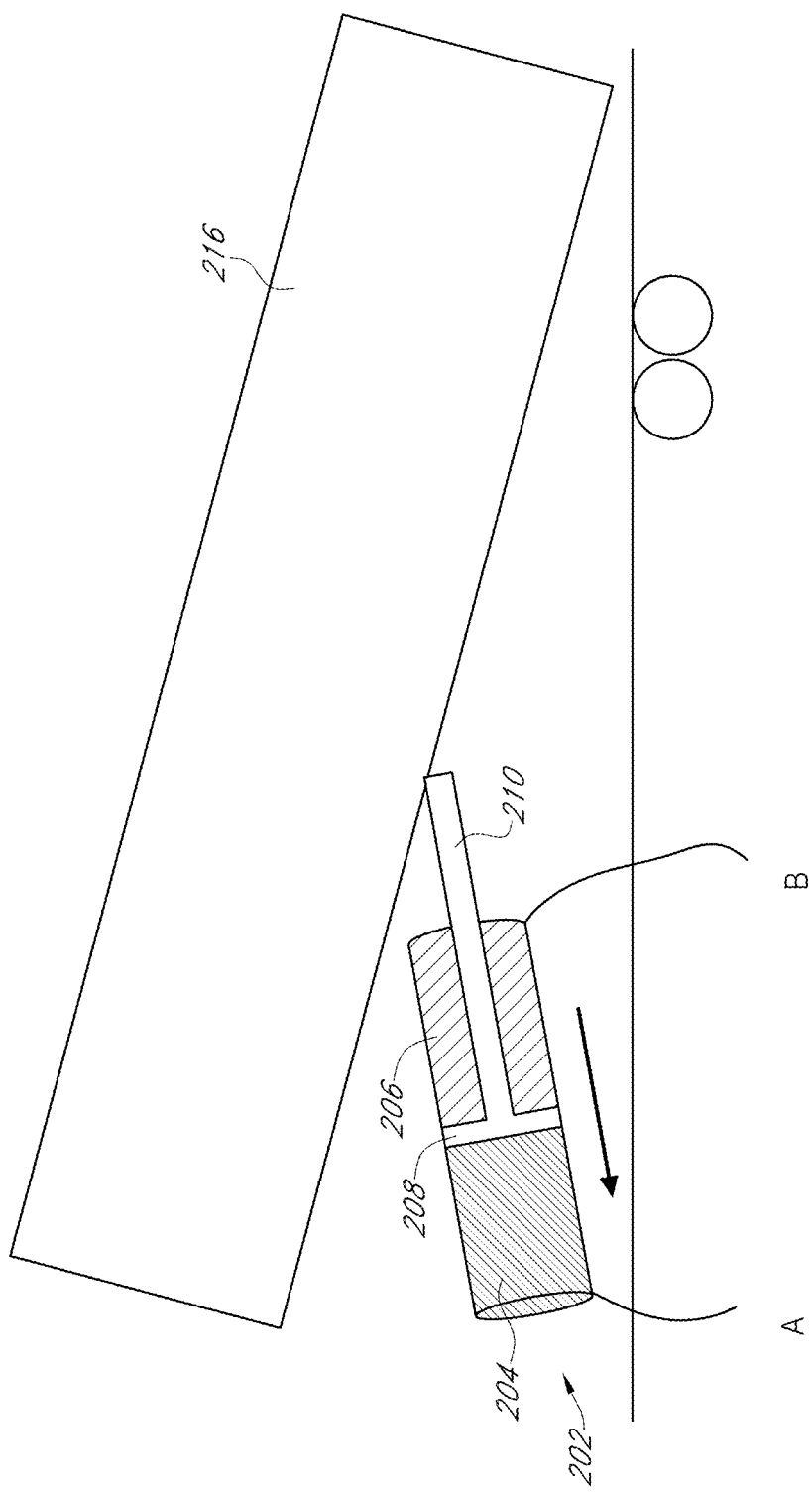

A double-acting hydraulic cylinder in various states relative to positions of a truck bed in accordance with an embodiment of the invention is illustrated in FIGS. 2A-C. In reference to FIG. 2A, the truck bed 216 is level and the hydraulic cylinder 202 is in its initial state. In many embodiments, the hydraulic cylinder 202 may include a first chamber 204 and a second chamber 206 separated by a piston 208. The piston 208 may be connected to a piston rod 210 that extends out from the second chamber 206 to attach to a structural device such as, but not limited to, a lift arm that may be connected to the truck bed 216 or directly to the truck bed 216. In addition, the first chamber 204 may have a first port connected to a first hydraulic tube 212 (may also be referred to as "first hose") that connects to an A port of an SHPU, as further described below. Likewise, the second chamber 206 may have a second port connected to a second hydraulic tube 214 (may also be referred to as "second hose") that connects to a B port of the SHPU, as further described below. In the initial state, the piston may be positioned such that the amount of hydraulic fluid in the first chamber 204 is less than when the hydraulic cylinder is in operation. For illustrative purposes, the amount of hydraulic fluid in the first chamber 204 is shown relatively smaller than the amount of hydraulic fluid in the second chamber 206.

In reference to FIG. 2B, the hydraulic cylinder 202 may be used to lift (may also be referred to as "raise") the truck bed 216. In such embodiments, the hydraulic fluid may be transferred from the second chamber 206 to the first chamber 204 via the SHPU (not illustrated) resulting in the movement of the piston 208 resulting in the piston rod 210 actuating (e.g., extending) and thus lifting the truck bed 216. During the process of extending, the piston 208 may move such that the piston rod 210 extends out and away from the rod end of the hydraulic cylinder 202. In many embodiments, the raising process may be initiated by an operator providing an input to the SHPU via an input device. For example, the operator may press an "up" button, as further described below. The operator may stop the raising process by providing an input to the SHPU, such as but not limited to, releasing the up button. In such embodiments, the SHPU may stop the movement of the hydraulic fluid from the second chamber 206 to the first chamber 204, and thus the truck bed 216 may be stopped at a particular position.

In reference to FIG. 2C, the hydraulic cylinder 202 may be configured to lower the truck bed 216. In such embodiments, the hydraulic fluid may be transferred from the first chamber 204 to the second chamber 206 via the SHPU (not illustrated) resulting in the movement of the piston 208 causing the piston rod 210 to retract, thereby lowering the truck bed 216. During the process of lowering, the piston 208 may move such that the piston rod 210 retracts towards the blind end of the hydraulic cylinder 202. In many embodiments, the lowering process may be initiated by an operator providing an input to the SHPU via an input device. For example, the operator may press a "down" button, as further described below. The operator may stop the lowering process by providing an input to the SHPU, such as but not limited to, releasing the down button. In such embodiments, the SHPU may stop the movement of the hydraulic fluid from the first chamber 204 to the second chamber 206, and thus the truck bed 216 may be stopped at a particular position.

Although specific hydraulic systems for dump trucks using double-acting hydraulic cylinders are discussed above with respect to FIGS. 1-2C, any of a variety of systems using various hydraulic devices as appropriate to the requirements of a specific application can be utilized in accordance with embodiments of the invention. SHPUs with submerged motors in accordance with embodiments of the invention are discussed further below.

SHPUs with Interchangeable Manifolds

SHPUs with interchangeable manifolds may include a base assembly that may include a tank and a lid. In many embodiments, the tank may receive and hold hydraulic fluid and be configured to house a motor and a pump submerged in the hydraulic fluid. In various embodiments, the motor and the pump may be a single unit or may be separate units connected as further described below. In several embodiments, SHPUs may be configured to allow interchangeability of various manifolds (e.g., single-acting manifold, double-acting manifold, single/double-acting, double double-acting, single double-acting, etc.), as further described below. Further, the SHPUs may include a start solenoid that may be exterior to the tank, as further described below.

In many embodiments, the motor may be connected be connected to a power supply that provides power to the motor based on at least one command signal, as further described below. The submerged motor may drive the pump for regulating the flow of hydraulic fluid between various components in a hydraulic system. For example, the pump (and/or the motor) may be connected to the interchangeable manifold, and the interchangeable manifold may have an A port and/or a B port to connect to a hydraulic device (e.g., hydraulic cylinder).

Figure 3:
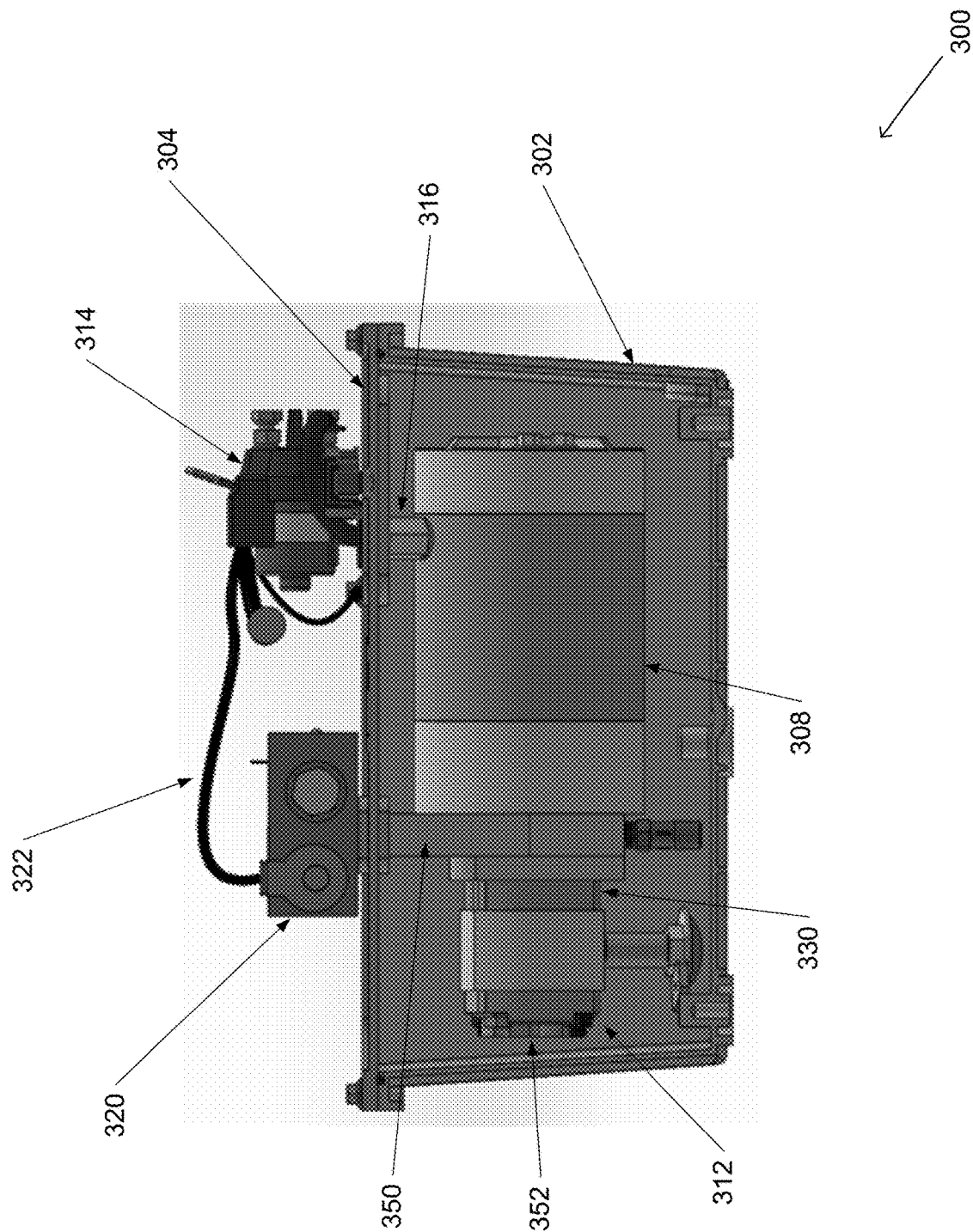
FIG. 3 is a side view of an SHPU with interchangeable manifolds in accordance with an embodiment of the invention.

A side view of submersible hydraulic power unit with interchangeable manifolds in accordance with an embodiment of the invention is shown in FIG. 3. The SHPU 300 may include a base assembly that may include a lid 304 and a tank 302 configured to house a motor 308 and a pump 312, as further described below. The motor 308 may be configured to drive the pump 312. In many embodiments, the motor 308 and the pump 312 may be connected using a coupler 330, as further described below. In some embodiments, the pump 312 may include one or more openings for accessing the hydraulic fluid in the tank 302. In some embodiments, the motor 308 may be secured to the lid 304 using a connector 316. In some embodiments, the motor 308 may be secured to an interior surface of the tank 302. The motor 308 may be secured to the lid 304 and/or the tank 302 using a variety of securing device(s) 316 known to one of ordinary skill in the art. In various embodiments, the lid 304 and/or the tank 302 may be made of a variety of materials such as, but not limited to, steel, cast aluminum, and/or any other suitable material known to one of ordinary skill in the art. In some embodiments, the tank 302 may be produced by welding the various sides and components. In some embodiments, the tank 302 may be produced using a die casting process. In some embodiments, the tank 302 may be produced using any combination of processes such as, but not limited to, welding and die casting. Further, the lid 304 and/or the tank 302 may be built to be a variety of sizes depending on various factors, such as, but not limited to, the size of the motor 308, the size of the pump 312, the particular hydraulic device for connecting to the SHPU, the space available for a particular application, etc. For example, the tank 302 may be built to hold 5 quarts, 10 quarts, 15 quarts, etc. of hydraulic fluid. In addition, the SHPU 300 may include one or more openings for filling and/or draining the tank 302, as further described below.

In some embodiments, the lid 304 may be removable from the tank 302 for access to the interior of the tank 302. In some embodiments, the lid 304 may be removed and the motor 308, pump 312, and any other component(s) may be accessed. In some embodiments, the motor 308 and/or the pump 312 may be connected to the lid 304 and removing the lid 304 may also allow removal of the motor 308 and/or pump 312 from the interior of the tank 302. In some embodiments, the motor 308 and/or the pump 312 may be contactless from the tank 302 and thus suspended in the hydraulic fluid via connection to the lid 304.

In further reference to FIG. 3, the SHPU 300 may also include an interchangeable manifold 320 connected to the pump 312 via a connector 350, as further described below. In many embodiments, the connector 350 may be hollow, thereby allowing hydraulic fluid to move between the tank 302 (via the pump 312) and the manifold 320, as further described herein. The interchangeable manifold 320 may include an A port to connect to a first chamber of the hydraulic cylinder and a B port to connect to a second chamber of the hydraulic cylinder, as further described herein. In many embodiments, the SHPU 300 may also include a start solenoid 314 connected to the motor 308 via one or more connector(s) 316 in placing the motor 308 into various configurations (e.g., a powered on or a powered off configuration), as further described herein. For example, in some embodiments, the start solenoid 314 may include and/or be attached to a power source (e.g., a battery). In some embodiments, the start solenoid 314 may be attached to the lid 304, as further described below. In some embodiments, the start solenoid 314 and/or the battery may be detached from the lid 304. In some embodiments, the connector(s) 316 may comprise the same or similar material to the composition of the tank 302 and/or the lid 304. In some embodiments, the connector(s) 316 may comprise material that repels hydraulic fluid for increased longevity. For example, the connector 316 may be made using a Nitrile rubber (i.e., Buna-N) material, etc.

Although specific SHPUs with interchangeable manifolds are discussed above with respect to FIG. 3, any of a variety of SHPUs with interchangeable manifolds including SHPUs with a variety of hydraulic components as appropriate to the requirements of a specific application can be utilized in accordance with embodiments of the invention. Further, although specific hydraulic components are illustrated as part of or connected to other components, the various hydraulic components may be either a part of or connected to other components as appropriate to the requirements of a specific application in accordance with embodiments of the invention. In addition, although specific hydraulic components are illustrated as being located in a particular position, the various hydraulic components may be placed in various positions as appropriate to the requirements of the specific application in accordance with embodiments of the invention. Circuit diagrams of SHPUs with interchangeable manifolds in accordance with embodiments of the invention are discussed further below.

Circuit Diagrams of SHPUs with Interchangeable Manifolds

As described above, an SHPU may include a motor, pump, tank, and various hydraulic components for moving hydraulic fluid in a hydraulic system (e.g., first and second chambers of a double-acting hydraulic cylinder). Circuit diagrams for an SHPU with a double-acting manifold are described below. However, one of ordinary skill in the art would appreciate that any number of circuit diagrams for any number of manifolds with various actions (e.g., single-acting, double-acting, single/double-acting, double single-acting, double double-acting) may be utilized with SHPUs. The circuit diagrams illustrated below are for exemplary purposes.

Figure 4:
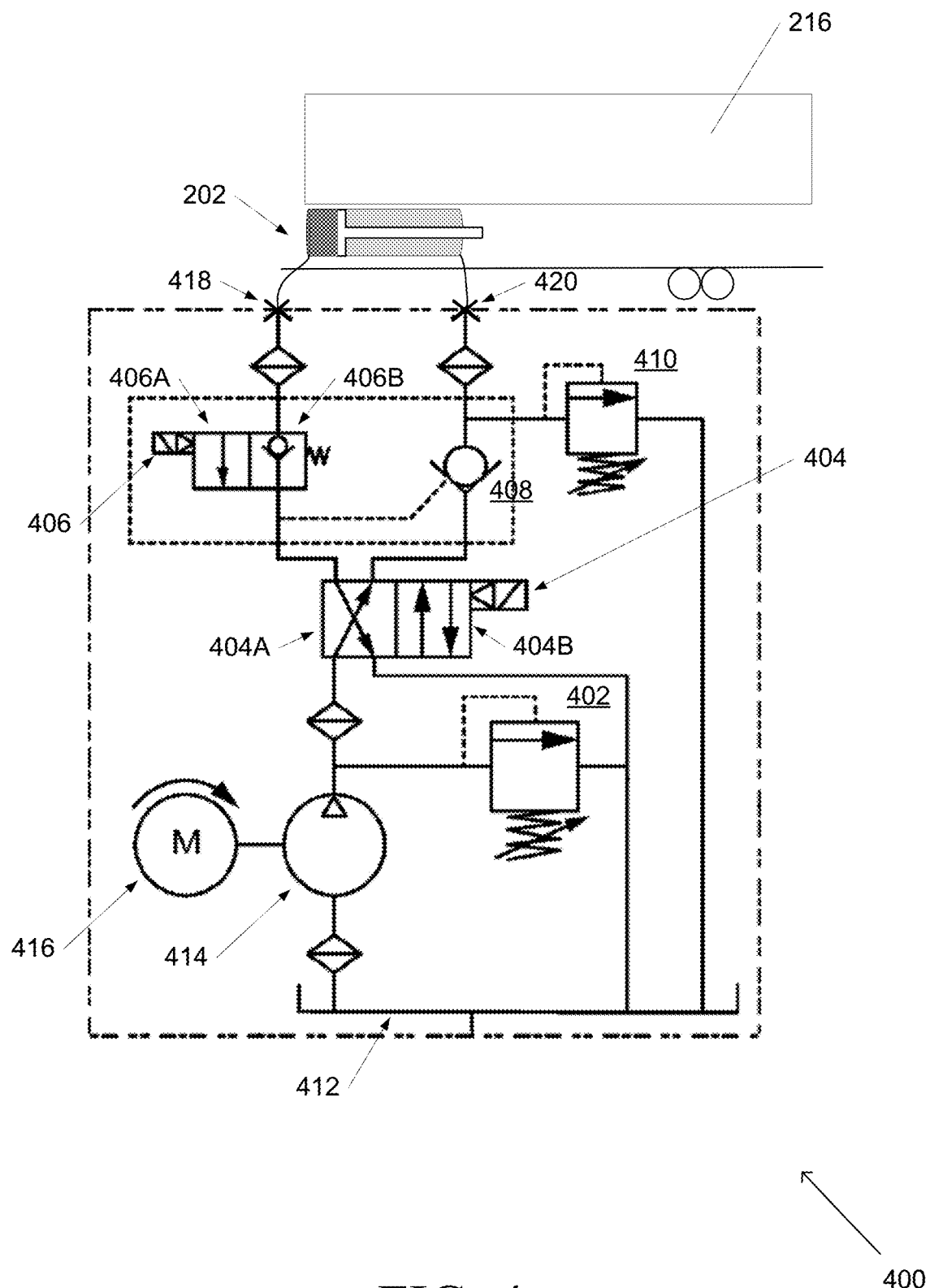
FIG. 4 is a circuit diagram illustrating an SHPU when a hydraulic cylinder is at rest (may also be referred to as a "neutral state" or "initial state") in accordance with an embodiment of the invention.

In an initial state, the SHPU typically is not providing power to the hydraulic cylinder, and the truck bed is static in the fully lowered position. A circuit diagram illustrating an SHPU when a hydraulic cylinder is at rest (may also be referred to as a "neutral state" or "initial state") in accordance with an embodiment of the invention is illustrated in FIG. 4. The diagram 400 of the SHPU with a double-acting manifold is shown connected to a hydraulic cylinder 202 with a truck bed 216 in a fully lowered position. As described above, the tank 412 holds the hydraulic fluid and is configured to house the motor 416 and/or the pump 414 submerged in the hydraulic fluid. As described herein, the motor 416 may be connected to a power source (not illustrated), and when the motor 416 is in the powered on configuration, the motor 416 may drive the pump 414 to push the hydraulic fluid from the tank 412 out of an A port 418 and/or a B port 420, thereby moving hydraulic fluid between a first chamber and a second chamber of the hydraulic cylinder 202.

In reference to FIG. 4, in the initial state, the motor 416 is in the powered off configuration, and the pump 414 is not activated. In various embodiments, the pump 414 may be connected to a first relief valve 402. The pump 414 may also be connected to a first solenoid valve 404 having a first position 404A and a second position 404B, as further described below. In the initial state, the first solenoid valve 404 may be in the first position 404A connecting the pump 414 to an open end (i.e., free flow direction end) of a first check valve 408. In many embodiments, the closed end (i.e., blocked flow direction) of the first check valve 408 may be connected to the B port 420 where the B port 420 may be connected to the second chamber of the hydraulic cylinder 202 via a second hose. In some embodiments, the closed end of the first check valve 408 may also be connected to a third cartridge relief valve 410 that connects to the tank 412.

In further reference to FIG. 4, the first chamber of the hydraulic cylinder 202 may be connected to the A port 418 via a first hose. In many embodiments, the A port 418 may be connected to a second solenoid valve 406, wherein the second solenoid valve 406 may have a first position and a second position. In various embodiments, the first position may include loading a control check valve 406A for the second solenoid valve 406, and the second position that may include loading a control single-directional connector 406B for the second solenoid valve 406. In the initial state, the second solenoid valve 406 may be in the first position and thus connect the A port 418 to a closed end of the control check valve 406A. In this configuration, the hydraulic cylinder 202 is held static since the hydraulic fluid in the first chamber is blocked from moving by the closed end of the control check valve 406A and the hydraulic fluid in the second chamber is blocked from moving by the closed end of the first check valve 408 and the second relief valve 410.

Although specific SHPUs with a double-acting manifold in an initial state for dump trucks are discussed above with respect to FIG. 4, any of a variety of SHPUs with interchangeable manifolds for various hydraulic systems as appropriate to the requirements of a specific application can be utilized in accordance with embodiments of the invention. Further, although various components (e.g., tank, pump, valves) are discussed above with respect to FIG. 4, any of a variety of components as appropriate to the requirements of a specific application can be utilized in accordance with embodiments of the invention. For example, various components discussed above with respect to FIG. 4 could be interchanged as appropriate to the requirements of a specific application in accordance with embodiments of the invention. Further, although specific valve setting values are discussed above with respect to FIG. 4, various valve setting values as appropriate to the requirements of a specific application can be utilized in accordance with embodiments of the invention.

AN SHPU with interchangeable manifolds may be configured to activate a hydraulic cylinder to raise or lower a truck bed. For example, the submerged motor may drive a submerged pump to transition hydraulic fluid between a first chamber and a second chamber of a hydraulic cylinder, thereby raising or lowering the truck bed. In many embodiments, the hydraulic cylinder may raise or lower the truck bed based on at least one command signal received from an input device. For example, an operator may use the input device to provide an up command signal, thereby raising the truck bed. Further, the operator may use the input device to provide a down command signal, thereby lowering the truck bed. As described further below, the at least one command signal may place the motor in a powered off configuration or a powered on configuration. Further, the at least one command signal may place the first solenoid in a first position or a second position. Likewise, the at least one command signal may place the second solenoid in a first position or a second position.

Figure 5:
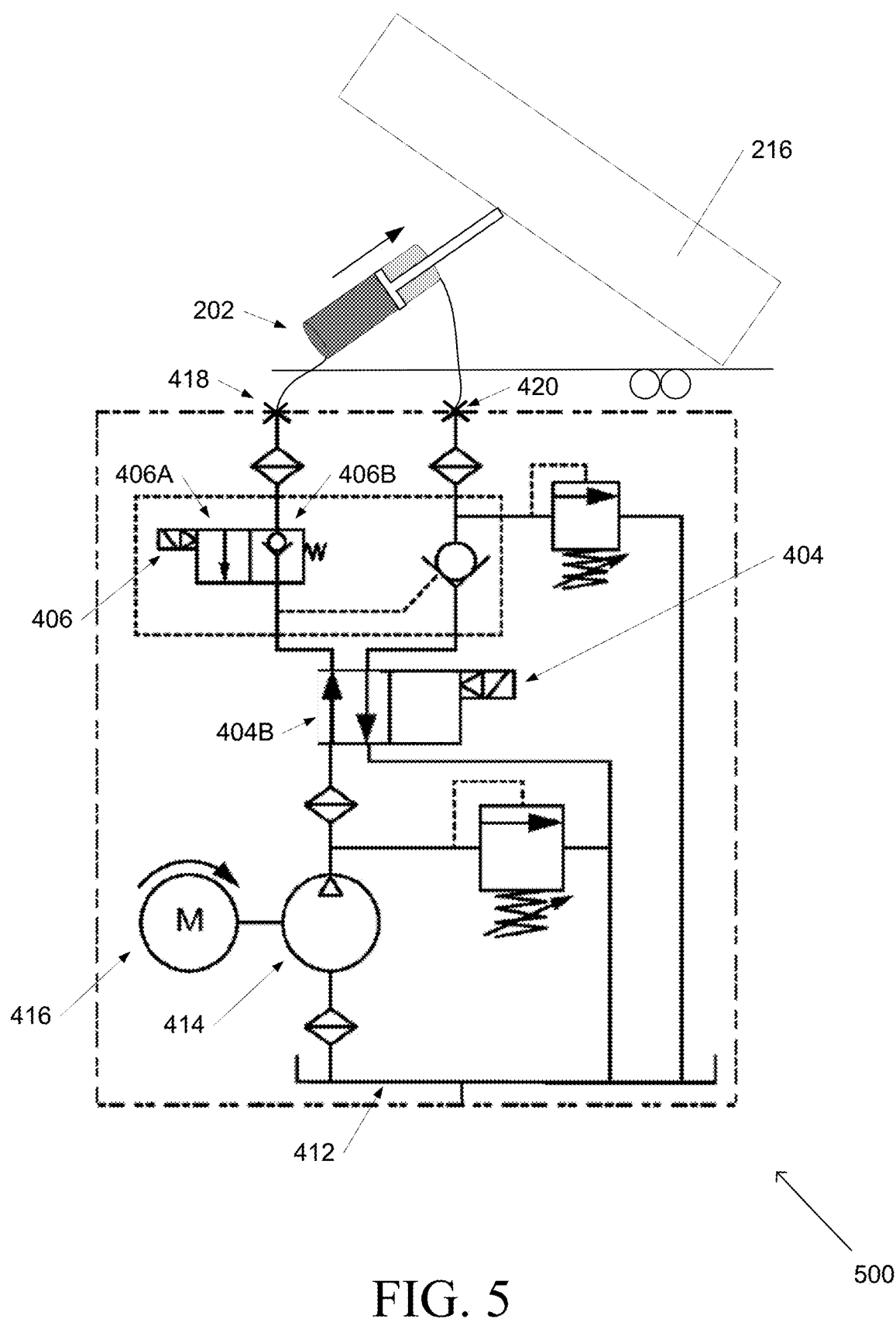
FIG. 5 is a circuit diagram illustrating an SHPU when a hydraulic cylinder is raising a truck bed in accordance with an embodiment of the invention.

A circuit diagram illustrating an SHPU when a hydraulic cylinder is raising a truck bed in accordance with an embodiment of the invention is illustrated in FIG. 5. In many embodiments, the raising of the truck bed may be initiated by the SHPU receiving an up command signal, as described above. In various embodiments, the up command signal may place the first solenoid valve 404 in a second position 404B. Further the up command signal may place the second solenoid valve 406 in a first position thereby loading the control check valve 406A.

In reference to FIG. 5, the diagram 500 of the SHPU is shown connected to a hydraulic cylinder 202 raising a truck bed 216. In many embodiments, the submerged motor 416 may be powered on and drive the pump 414 by turning the pump 414 and routing fluid from the tank 412 to the first solenoid valve 404 in a second position 404B. For example, in response to a command signal (e.g., up command signal), the first solenoid valve 404 may energize and transition from a first position 404A to the second position 404B. In the second position 404B, the SHPU may allow the hydraulic fluid from the pump 414 to be directed to the open end of the control check valve 406A of the second solenoid 406 in its first position. The hydraulic fluid may then exit the A port 418 through a first hose connecting the A port 418 to the hydraulic cylinder 202. Thus, the hydraulic fluid may enter through the blind end of the cylinder and apply force on to the piston to extend the piston rod, thereby raising the truck bed 216.

In further reference to FIG. 5, hydraulic fluid in the second chamber of the hydraulic cylinder 202 may be moved to the tank 412. In many embodiments, the hydraulic fluid from the second chamber may get pushed out of the hydraulic cylinder 202 through a second hose connected to the B port 420. In such embodiments, the hydraulic fluid may be routed through the closed end of the first check valve 408 by overcoming the valve setting of the first check valve 408, as described above. The hydraulic fluid may then flow through the first solenoid valve 404 in the second position 404B, allowing the hydraulic fluid to return back to the tank 412.

Figure 6:
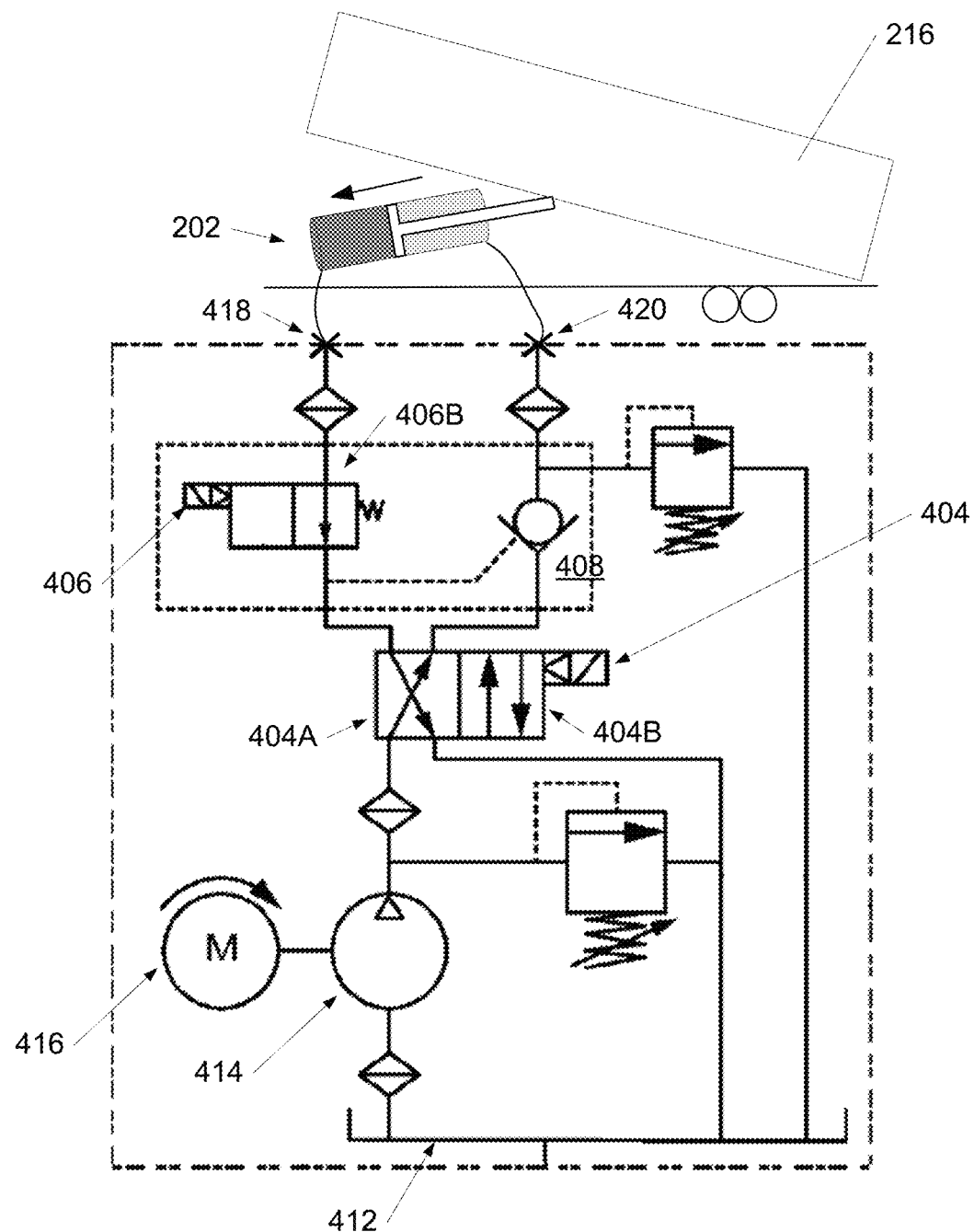
FIG. 6 is a circuit diagram illustrating an SHPU when a hydraulic cylinder is lowering a truck bed in accordance with an embodiment of the invention.

A circuit diagram illustrating an SHPU when a hydraulic cylinder is lowering a truck bed in accordance with an embodiment of the invention is illustrated in FIG. 6. In many embodiments, the lowering of the truck bed may be initiated by the SHPU receiving a down command signal, as described above. In various embodiments, the down command signal may place the first solenoid valve 404 in a first position 404A. Further the down command signal may place the second solenoid valve 406 in a second position, thereby loading the control single-directional connector 406B.

In reference to FIG. 6, the diagram 600 of the SHPU is shown connected to a hydraulic cylinder 202 lowering the truck bed 216. In many embodiments, the down command signal may place the motor 416 in the powered on configuration, thereby driving the pump 414 and routing fluid from the tank 412 to the first solenoid valve 404 in the first position 404A. For example, in various embodiments, the down command signal may energize the first solenoid valve 404, transitioning the first solenoid valve 404 from the second position 404B to the first position 404A and allowing the hydraulic fluid to flow from the pump 414 and be directed to the open end of the first check valve 408. The hydraulic fluid may then exit the B port 420 through a second hose connecting the B port 420 to the second chamber of the hydraulic cylinder 420. Thus, the hydraulic fluid may enter through the rod end of the cylinder and apply force onto the piston to retract the piston rod lowering the truck bed 216.

In further reference to FIG. 6, the hydraulic fluid in the first chamber may be pushed out and returned back to the tank 412. For example, the hydraulic fluid from the first chamber may get pushed out of the first chamber though a first hose connecting to the A port 418. In such embodiments, the second solenoid valve 406 may be in a second position (i.e., loading the control single-directional connector 406B) that allows hydraulic fluid to flow through the control single-directional connector 406B routing the hydraulic fluid to the first solenoid 404 in its first position 404A. In various embodiments, the first position 404A of the first solenoid 404 routes the hydraulic fluid back in to the tank 412.

Although specific SHPUs with interchangeable manifolds for raising and lowering truck beds are discussed above with respect to FIGS. 5-6, any of a variety of SHPUs with interchangeable manifolds for various hydraulic systems as appropriate to the requirements of a specific application can be utilized in accordance with embodiments of the invention. Further, although various components (e.g., tanks, pumps, valves) are discussed above with respect to FIGS. 5-6, any of a variety of components as appropriate to the requirements of a specific application can be utilized in accordance with embodiments of the invention. For example, various components discussed above with respect to FIGS. 5-6 could be interchanged as appropriate to the requirements of a specific application in accordance with embodiments of the invention. Further, although specific valve setting values are discussed above with respect to FIGS. 5-6, various valve setting values as appropriate to the requirements of a specific application can be utilized in accordance with embodiments of the invention. Base assemblies of SHPUs with interchangeable manifolds in accordance with embodiments of the invention are discussed further below.

Base Assemblies of SHPUs

Figure 7A:
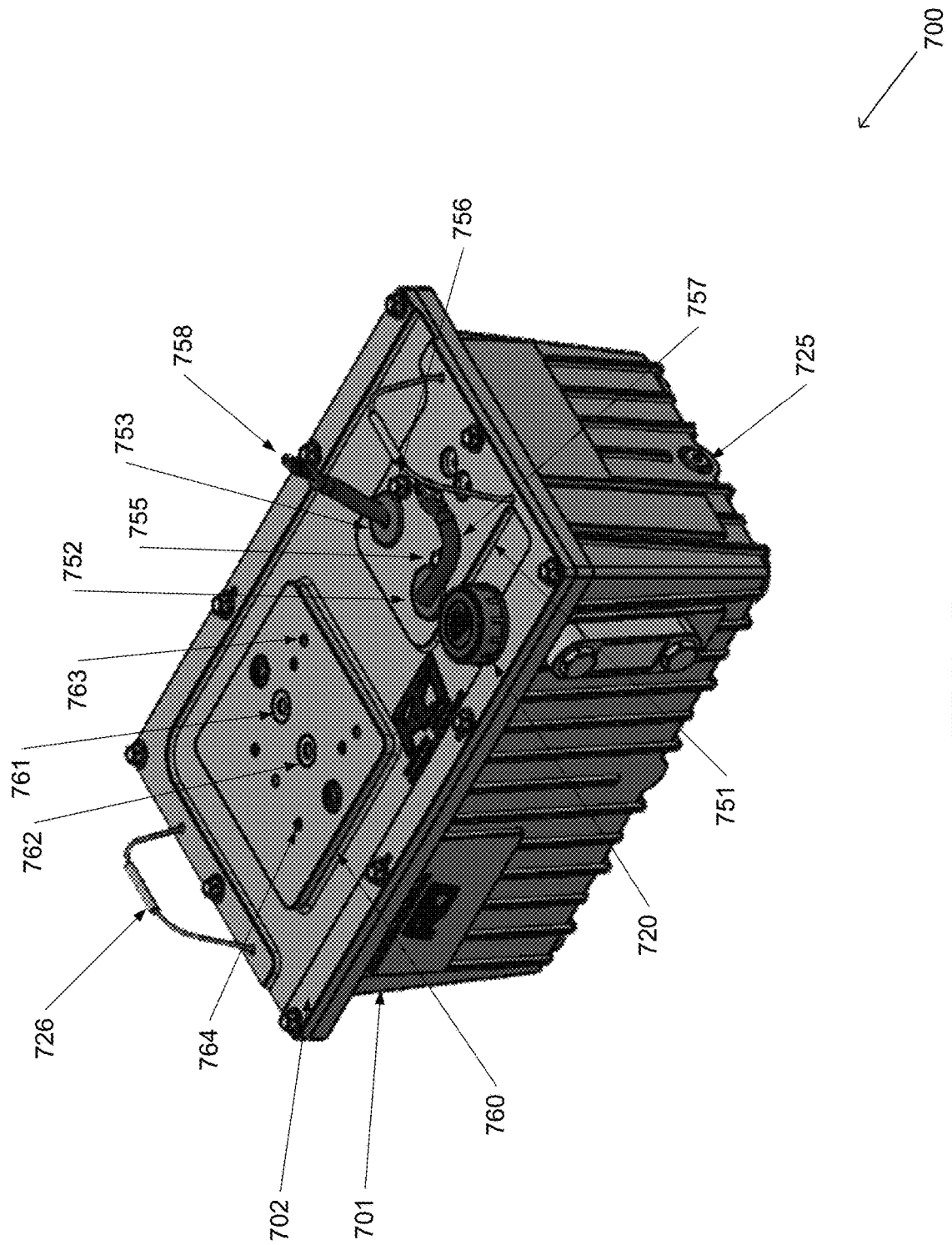
FIG. 7A a front perspective view of a base assembly of an SHPU in accordance with an embodiment of the invention.

SHPUs may include base assemblies having a tank and a lid allowing for interchangeability of manifolds. A front perspective view of a base assembly of an SHPU in accordance with an embodiment of the invention is shown in FIG. 7A. The base assembly 700 may include a tank 701 and a lid 702. In some embodiments, the lid 702 may be removable from the tank 701 allowing access to the inside of the tank 701. For example, the lid 702 may be attached to and removed from the tank 701 using one or more screws or any other securing mechanisms, as further described below.

In reference to FIG. 7A, the lid 702 and/or the tank 701 may be configured to have one or more openings to access the inside of the tank 701. For example, the lid 702 may have an opening for filling the tank 701 with hydraulic fluid, as further described below. Further, the lid 702 may also have one or more openings to connect an interchangeable manifold with the pump located inside of the tank 701. In some embodiments, the lid 702 may include a manifold receiving area 760 that may include one or more manifold connection points (e.g., a first manifold connection point 763, a second manifold connection point 764, etc.) for attaching and detaching an interchangeable manifold, as further described below. The lid 702 may further include one or more openings (e.g. a first manifold receiving opening 761, a second manifold receiving opening 762, etc.) for connecting the interchangeable manifold with the pump located inside of the tank 701.

In further reference to FIG. 7A, the lid 702 may also have one or more openings to connect the start solenoid with the motor located inside of the tank 701. For example, the lid 702 may include a start solenoid receiving area 751 that may include one or more start solenoid connection points (e.g., a first start solenoid connection point 755, a second start solenoid connection point 756, etc.) for attaching and detaching a start solenoid. The lid 702 may further include one or more openings (e.g. a first start solenoid receiving opening 752, a second start solenoid receiving opening 753, etc.) for connecting the start solenoid with the motor located inside of the tank 701. In many embodiments, the start solenoid may connect with the motor using a first connector 757 and/or a second connector 758, as further described below.

In further reference to FIG. 7A, the lid 702 may include a first fluid opening that may be covered with a cap 720 for filling the tank 701 with hydraulic fluid. In some embodiments, the cap 720 may also include a measuring stick for measuring the amount of hydraulic fluid in the tank 701. The tank 701 may also include a second fluid opening that may be covered with a plug 725 (e.g., an O-ring plug) for draining the hydraulic fluid from the tank 702. In many embodiments, the cap 720 and/or plug 725 may be fitted and/or mated with their respective openings in the lid 702 and/or tank 701 in a manner known to one of ordinary skill in the art. For example, the cap 720 and/or plug 725 may open and close their respective openings using a thread fit or any other closure device and/or system known to one of ordinary skill. In some embodiments, the first fluid opening may be located on a top surface of the lid 702 to take advantage of gravity acting on the hydraulic fluid in filling the tank 701 with the hydraulic fluid. In some embodiments, the second fluid opening may be located on a side surface of the tank 701 and/or located closer to a bottom surface to take advantage of gravity acting on the hydraulic fluid in draining the hydraulic fluid from the tank 701. The tank 701 may be filled with a variety of levels of hydraulic fluid. In many embodiments, the tank 701 may be filled with hydraulic fluid to submerge the motor and/or pump. For example, in some embodiments, the tank 701 may be 80% filled with the hydraulic fluid. In some embodiments, the amount of hydraulic fluid may depend on the hydraulic fluid capacity of the hydraulic device connected to the SHPU. For example, the tank 701 may be filled to a different capacity when operating a 2-inch cylinder vs a 5-inch cylinder.

Figure 7B:
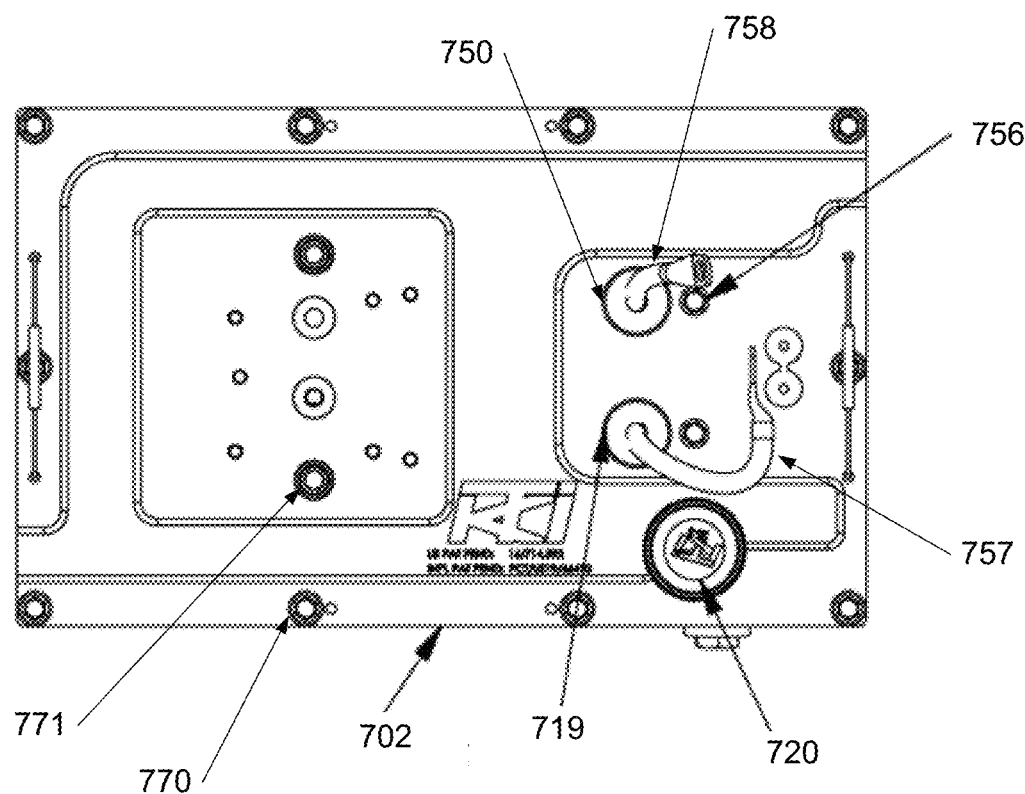
FIG. 7B is a schematic diagram illustrating a top view of a base assembly of an SHPU in accordance with an embodiment of the invention.

A schematic diagram illustrating a top view of a base assembly of an SHPU in accordance with an embodiment of the invention is shown in FIG. 7B. As described above, the cap 720 may provide accesses to the tank 701 via the lid 702. In some embodiments, the first solenoid receiving opening 752 may include a grommet 719 for providing support to the first connector 757. In some embodiments, the second solenoid receiving opening 753 may include a grommet 750 for providing support to the second connector 758. In many embodiments, the lid 702 may include various holes allowing for various securing mechanisms (e.g., screws, nuts, bolts, washers, etc.) for connecting the lid 702 to the tank 701, motor, pump, as described above. For example, the lid 702 may be secured to the tank 701 using one or more securing mechanisms 770, as further described below. Further, the pump and/or motor may be secured to the lid using one or more securing mechanisms 771, as further described below.

Figure 7C:
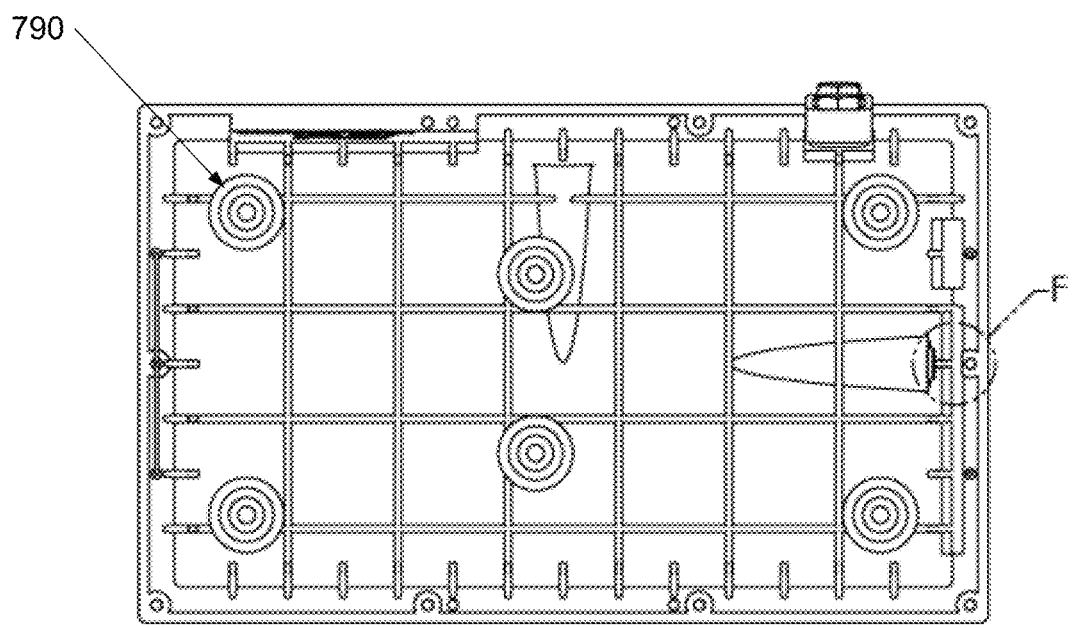
FIG. 7C is a schematic diagram illustrating a bottom view of a base assembly of an SHPU in accordance with an embodiment of the invention.

A schematic diagram illustrating a bottom view of a base assembly of an SHPU in accordance with an embodiment of the invention is shown in FIG. 7C. In some embodiments, the base assembly 700 may include one or more floor contacts 790 for providing support to the SHPU. In some embodiments, the floor contacts 790 may include a non-slip surface and/or be reinforced to provide additional structural support to the SHPU.

Figure 7D:
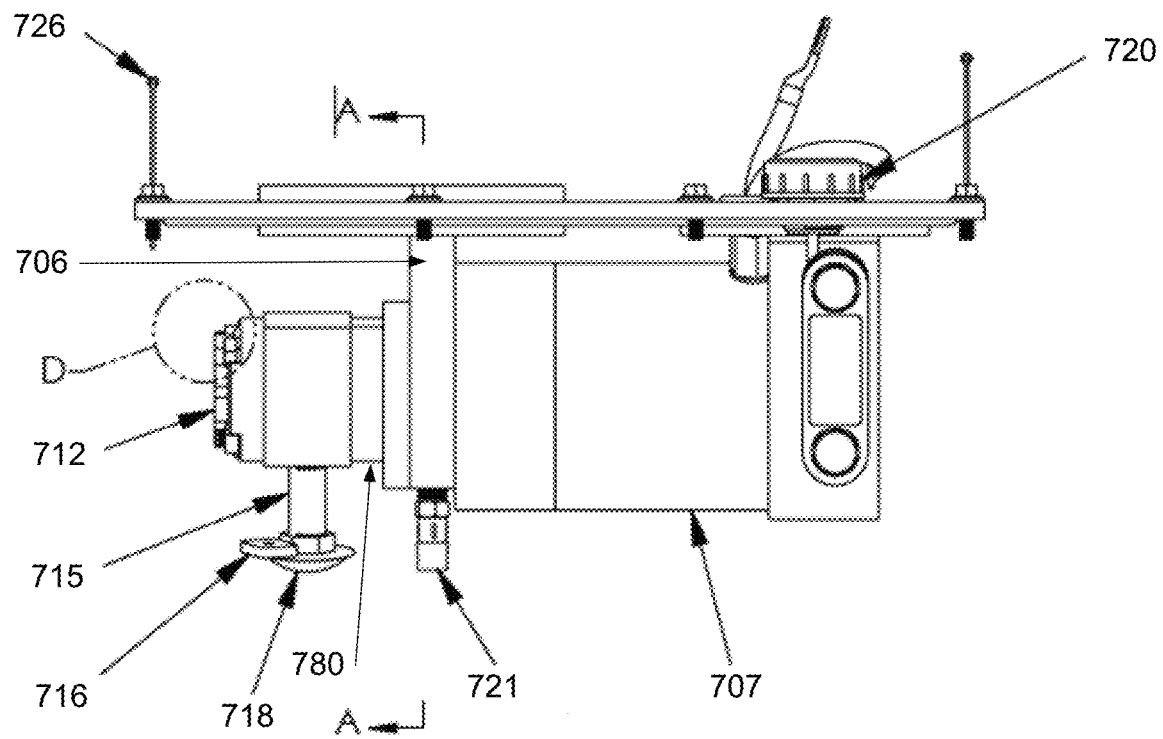
FIG. 7D is a schematic diagram illustrating a side view of a base assembly of an SHPU with a tank removed in accordance with an embodiment of the invention.

A schematic diagram illustrating a side view of a base assembly of an SHPU with a tank removed in accordance with an embodiment of the invention is shown in FIG. 7D. As described above, the cap 720 and handle 726 are illustrated. In some embodiments, the pump 712 and the motor 707 may be attached using any attachment mechanism (may also be referred to as a "securing mechanism") such as, but not limited to, nuts, bolts, etc. In some embodiments, the pump 712 may be connected to the motor 707 via a coupler 780 that couples the motor 707 to a shaft of the pump 712. For example, the coupler 780 may be a hex coupler, etc. In some embodiments, the pump 712 may include one or more openings for accessing the hydraulic fluid in the tank 701. In several embodiments, the pump 712 may also include a pipe 715 (e.g., an iron pipe) and a magnet 716 (e.g., a rectangle carbon magnet). In some embodiments, the pump 712 may also include an inlet strainer 718. In some embodiments, the pump 712 and the motor 707 may be further attached via an adaptor 706 having a hose adaptor 721 (e.g., plastic hose adaptor), as further described below. As described above, in some embodiments, the adapter 706 may also connect the interchangeable manifold to the pump 712.

In reference to FIG. 7D, the pump 712 may be a hydraulic gear pump and the motor 707 may be an electric direct current ("DC") powered motor 707 or an alternating current ("AC") powered motor 707. In operation, the motor 707 may turn the pump 712, and the pump 712 may take hydraulic fluid from the tank 701 and push the hydraulic fluid out of the tank 701 for moving hydraulic fluid between the first chamber and the second chamber of an attached hydraulic cylinder via the interchangeable manifold, as further described herein. Further, in some embodiments, the motor 707 may turn the pump 712, and the pump 712 may pull hydraulic fluid into the tank 701 in moving hydraulic fluid between the first chamber and the second chamber of an attached hydraulic cylinder via the interchangeable manifold, as further described herein.

Figure 7E:
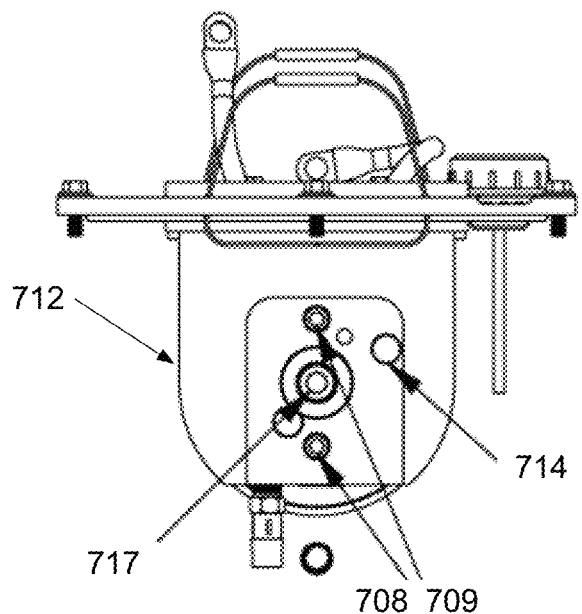
FIG. 7E is a schematic diagram illustrating a front view of a base assembly of an SHPU with a tank removed in accordance with an embodiment of the invention.

A schematic diagram illustrating a front view of a base assembly of an SHPU with a tank removed in accordance with an embodiment of the invention is shown in FIG. 7E. The pump 712 may include a coupler 717 and one or more securing mechanisms (e.g., screw and/or washer 714, and screws and/or washers 708, 709).

Figure 7F:
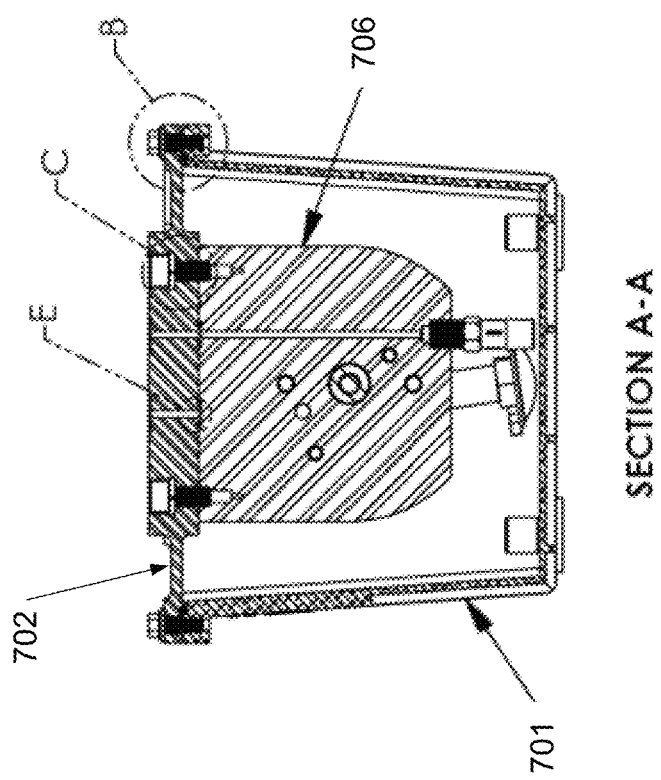
FIG. 7F is a schematic diagram illustrating a rear sectional view of a base assembly of an SHPU along an A-A axis of FIG. 7D in accordance with an embodiment of the invention.

A schematic diagram illustrating a rear sectional view of a base assembly of an SHPU along an A-A axis of FIG. 7D in accordance with an embodiment of the invention is shown in FIG. 7F. The A-A axis may include a cross section of the tank 701 and the adaptor 706. As further described above, the tank 701 may be attached to the lid 702 using one or more lid to tank securing mechanisms 770 (see Detail B). Further, the lid 702 may be attached to the pump and/or motor using one or more lid to pump/motor securing mechanisms 771 (see Detail C). In addition, the lid 702 may include one or more manifold receiving openings 761, 762 (see Detail E).

A schematic diagram illustrating a close up of Detail B of FIG. 7F in accordance with an embodiment of the invention is shown in FIG. 7G. As described above, the tank 701 and the lid 702 may be attached and/or detached using one or more lid to tank securing mechanisms 770. In some embodiments, the one or more lid to tank securing mechanisms 770 may include a washer 704 (e.g., a flat washer) and screw 705 (e.g., a hex flange head cap screw). In some embodiments, area where the tank 701 and the lid 702 are attached may also include O-rings 703 for additional support.

A schematic diagram illustrating a close up of Detail C of FIG. 7F in accordance with an embodiment of the invention is shown in FIG. 7H. As described above, the lid 702 may be attached and/or detached to the pump and/or motor using one or more lid to pump/motor securing mechanisms 771. In some embodiments, the one or more lid to pump/motor securing mechanisms 771 may include a washer 710 (e.g., a steel split lock washer) and screw 711 (e.g., a socket head cap screw).

A schematic diagram illustrating a close up of Detail D of FIG. 7D in accordance with an embodiment of the invention is shown in FIG. 7I. As described above, the pump 712 may be attached to a coupler 717 using a securing mechanism such as a washer 713 (e.g., split lock washer) and a screw 714 (e.g., a hex head cap screw).

A schematic diagram illustrating a close up of Detail E of FIG. 7F in accordance with an embodiment of the invention is shown in FIG. 7J. As further described above, the lid 702 may include one or more manifold receiving openings 761, 762. In some embodiments, one of the manifold receiving openings 761 or 762 may connect to the adaptor 706 using one or more O-rings 722. In some embodiments, one of the manifold receiving openings 762 or 761 may connect to the hose adaptor 721, as further described above.

Although specific base assemblies of SHPUs are discussed above with respect to FIGS. 7A-7J, any of a variety of base assemblies, including various lids and tanks, as appropriate to the requirements of a specific application can be utilized in accordance with embodiments of the invention. Further, although various components (e.g., pumps, motors, interchangeable manifolds, connectors, openings, caps, plugs, securing mechanisms, etc.) are discussed above with respect to FIGS. 7A-7J, any of a variety of components as appropriate to the requirements of a specific application can be utilized in accordance with embodiments of the invention. For example, various components discussed above with respect to FIGS. 7A-7J could be interchanged as appropriate to the requirements of a specific application in accordance with embodiments of the invention. Interchangeable manifolds in accordance with embodiments of the invention are discussed further below.

Interchangeable Manifolds

SHPUs allow for the interchangeability of manifolds based on the needs of the hydraulic system. For example, an interchangeable manifold may include a single-acting manifold, a double-acting manifold, a single/double-acting manifold, a double double-acting manifold, a double single-acting manifold, etc.

Figure 8A:
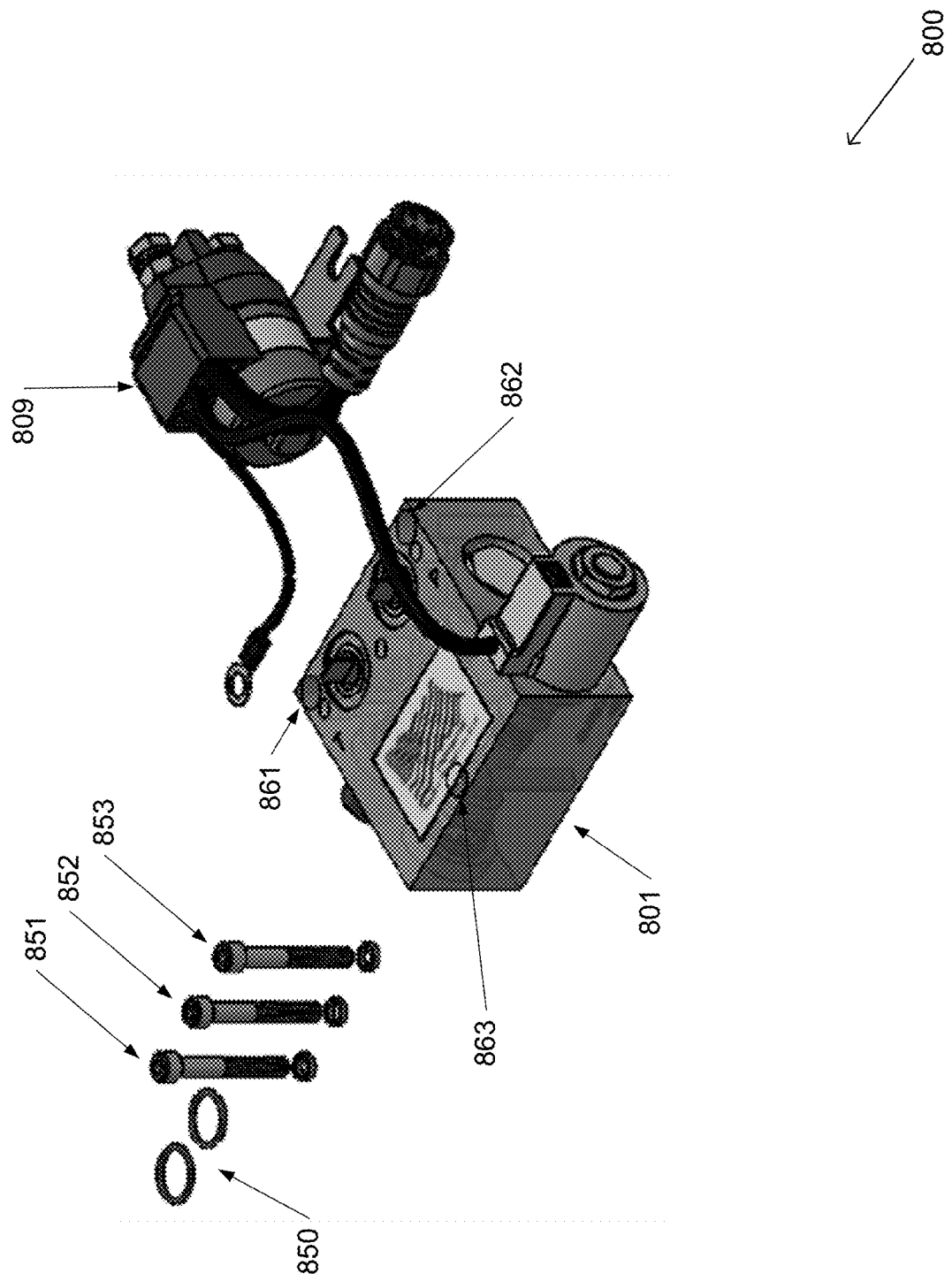
FIG. 8A is a front perspective view of a single-acting manifold assembly in accordance with an embodiment of the invention.

A front perspective view of a single-acting manifold assembly in accordance with an embodiment of the invention is shown in FIG. 8A. The single-acting manifold assembly 800 may include a single-acting manifold 801 that may be connected to a start solenoid 809, as further described above. In many embodiments, the single-acting manifold 801 may include one or more receiving holes (e.g., a first receiving hole 861, a second receiving hole 862, a third receiving hole 863) for receiving one or more securing mechanisms (e.g., a first screw and/or washer 851, a second screw and/or washer 852, a third screw and/or washer 853, etc.). In many embodiments, the single-acting manifold 801 may be attached and/or detached from a lid 702 by securing the single-acting manifold 801 to the lid 702 using the securing mechanisms 851, 852, 853. For example, the single-acting manifold 801 may be placed on the manifold receiving area 760 and secured by inserting a securing mechanism 851, 852, 853 through a receiving hole 861, 862, 863 and attaching the securing mechanism(s) 851, 852, 853 to a manifold connection point (e.g., the first manifold connection point 763, the second manifold connection point 764, etc.). In some embodiments, one or more washers (e.g., washers 850) may be placed between the single-acting manifold 801 and the lid 702 at the first and/or second manifold receiving openings 761, 762. The single-acting manifold 801 may be detached, and interchanged, by releasing the securing mechanism(s) 851, 852, 853 from the manifold connection point(s) (e.g., the first manifold connection point 763, the second manifold connection point 764, etc.).

Figure 8B:
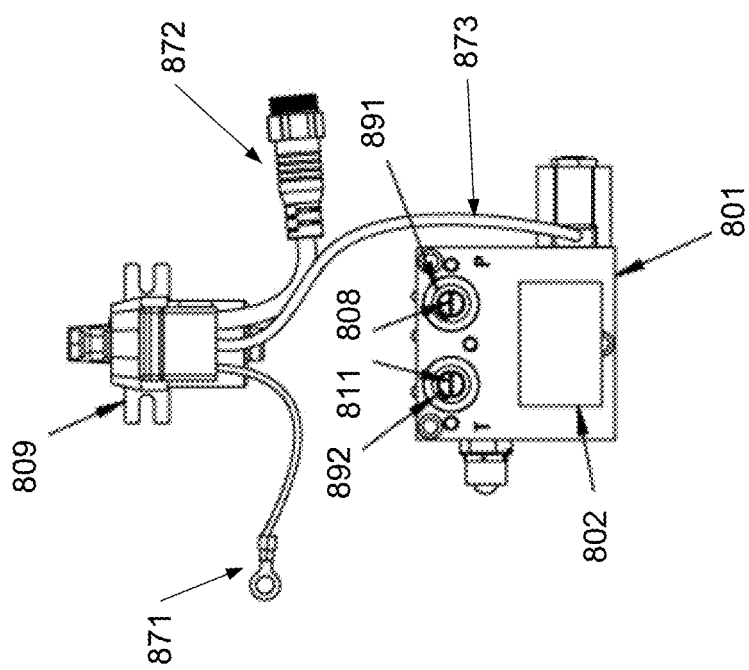
FIG. 8B is a schematic diagram illustrating a top view of a single-acting manifold assembly in accordance with an embodiment of the invention.

A schematic diagram illustrating a top view of a single-acting manifold assembly in accordance with an embodiment of the invention is shown in FIG. 8B. In many embodiments, the single-acting manifold 801 may include a "P" port 891 for supplying high-pressure working fluid to an actuator of a hydraulic system and a "T" port 892 for returning working fluid from the actuator of the hydraulic system. In some embodiments, the P port 891 may be covered with a plug 808 and the T port 892 may be covered with a plug 811. In some embodiments, the single-acting manifold 801 may include a label 802 identifying a source of the manifold and/or SHPU and/or for providing any other information.

In reference to FIG. 8B, the single-acting manifold assembly may also include a start solenoid 809 connected to the single-acting manifold via a manifold connector 873, as further described below. In many embodiments, the start solenoid 809 may also include a power connector 871 for connecting to a power source (e.g., a negative terminal of a battery and/or ground), as described herein. In some embodiments, the start solenoid 809 may further include a controller connector 872 that may connect to an input device for receiving at least one command signal, as further described above.

Figure 8C:
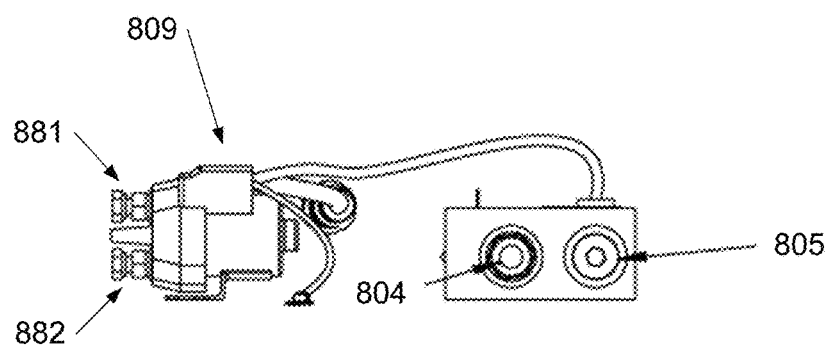
FIG. 8C is a schematic diagram illustrating a left side view of a single-acting manifold assembly in accordance with an embodiment of the invention.

A schematic diagram illustrating a left side view of a single-acting manifold assembly in accordance with an embodiment of the invention is shown in FIG. 8C. In some embodiments, the start solenoid 809 may also include a power connector 881. In various embodiments, the power connector 881 may connect to a power source (e.g., a positive terminal of a battery). Further, the single-acting manifold 801 may include a cartridge relief valve 804 and an O-ring plug 805.

Figure 8D:
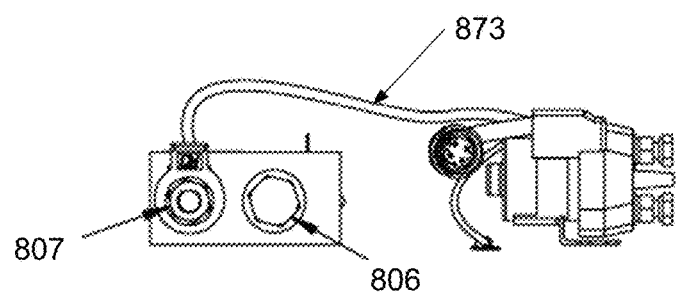
FIG. 8D is a schematic diagram illustrating a right side view of a single-acting manifold assembly in accordance with an embodiment of the invention.

A schematic diagram illustrating a right side view of a single-acting manifold assembly in accordance with an embodiment of the invention is shown in FIG. 8D. The single acting manifold 801 may include a cartridge check valve 806 and a cartridge solenoid valve 807. In some embodiments, the cartridge check valve 806 may be a direct-acting poppet-type cartridge check valve. As described above, the start solenoid 809 may be connected by a manifold connector 873 to the single-acting manifold 800. In many embodiments, the manifold connector 873 may connect to the cartridge solenoid valve 807.

Figure 8E:
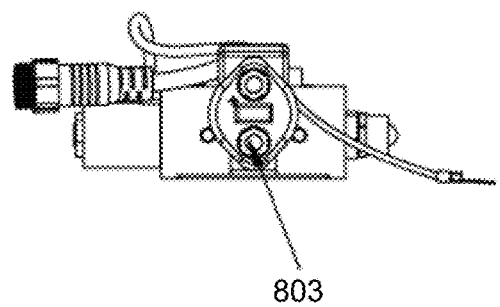
FIG. 8E is a schematic diagram illustrating a rear view of a single-acting manifold assembly in accordance with an embodiment of the invention.
Figure 8F:
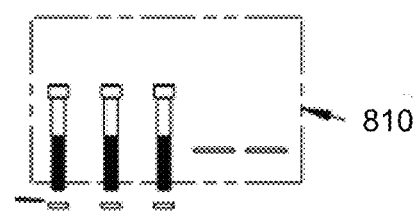
FIG. 8F is a schematic diagram illustrating a mounting assembly for a single-acting manifold assembly in accordance with an embodiment of the invention.

A schematic diagram illustrating a rear view of a single-acting manifold assembly in accordance with an embodiment of the invention is shown in FIG. 8E. In many embodiments, the start solenoid 809 may include one or more plugs 803 such as, but not limited to a tapered cap plug. A schematic diagram illustrating a mounting assembly for a single-acting manifold assembly in accordance with an embodiment of the invention is shown in FIG. 8F. The mounting assembly 810 may include one or more securing mechanisms 851, 852, 853 and/or one or more washers 850, as further described above.

Figure 9A:
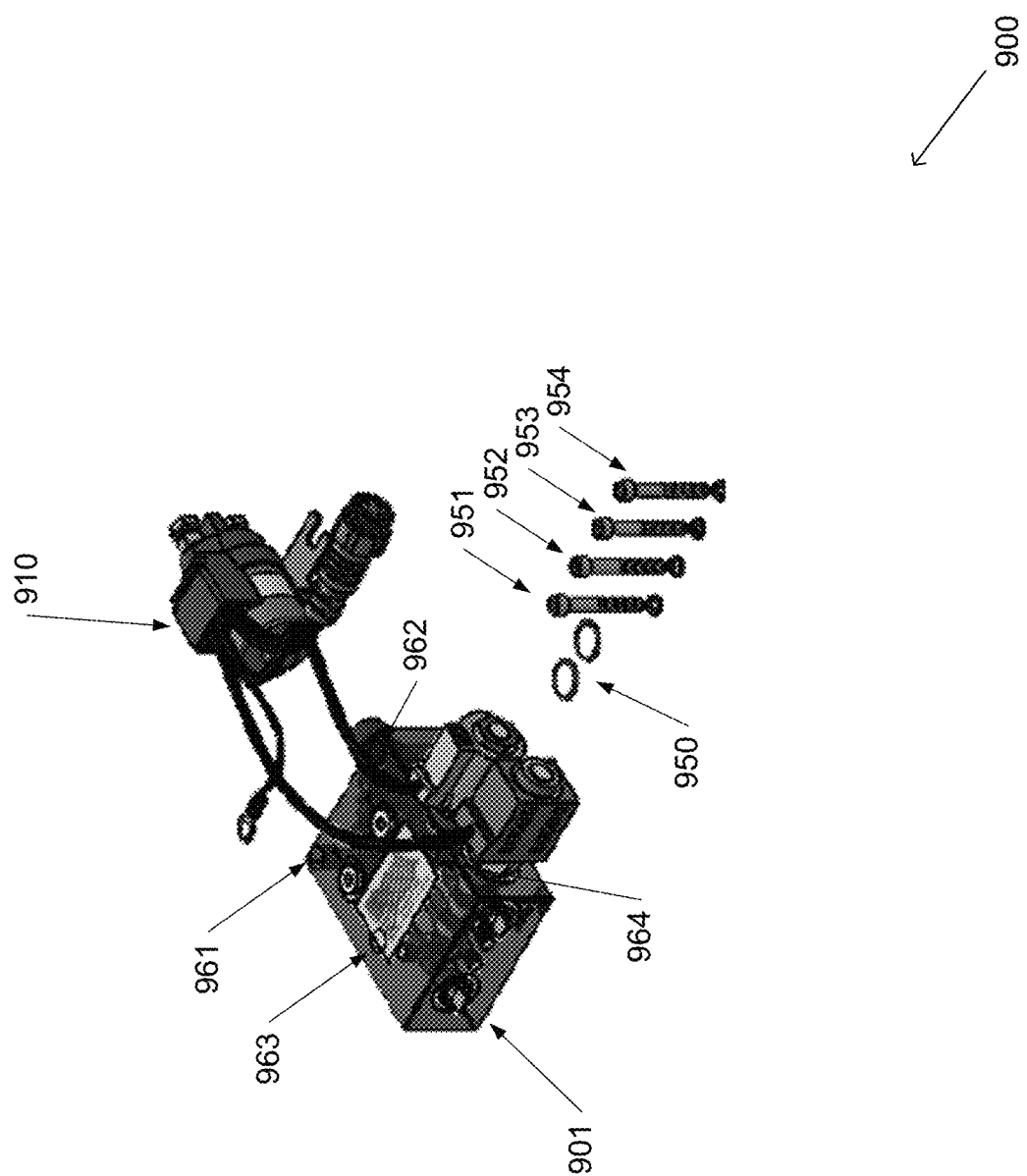
FIG. 9A is a front perspective view of a double-acting manifold assembly in accordance with an embodiment of the invention.

A front perspective view of a double-acting manifold assembly in accordance with an embodiment of the invention is shown in FIG. 9A. The double-acting manifold assembly 900 may include a double-acting manifold 901 that may be connected to a start solenoid 910, as further described above. In many embodiments, the double-acting manifold 901 may include one or more receiving holes (e.g., a first receiving hole 961, a second receiving hole 962, a third receiving hole 963, a fourth receiving hole 964, etc.) for receiving one or more securing mechanisms (e.g., a first screw and/or washer 951, a second screw and/or washer 952, a third screw and/or washer 953, a fourth screw and/or washer 954, etc.). In many embodiments, the double-acting manifold 901 may be attached and/or detached from a lid 702 by securing the double-acting manifold 901 to the lid 702 using the securing mechanisms 951, 952, 953, 954. For example, the double-acting manifold 901 may be placed on the manifold receiving area 760 and secured by inserting a securing mechanism 951, 952, 953, 954 through a receiving hole 961, 962, 963, 964 and attaching the securing mechanism(s) 951, 952, 953, 954 to a manifold connection point (e.g., the first manifold connection point 763, the second manifold connection point 764, etc.). In some embodiments, one or more washers (e.g., washers 950) may be placed between the double-acting manifold 901 and the lid 702 at the first and/or second manifold receiving openings 761, 762. The double-acting manifold 901 may be detached, and interchanged, by releasing the securing mechanism(s) 951, 952, 953, 954 from the manifold connection point(s) (e.g., the first manifold connection point 763, the second manifold connection point 764, etc.).

Figure 9B:
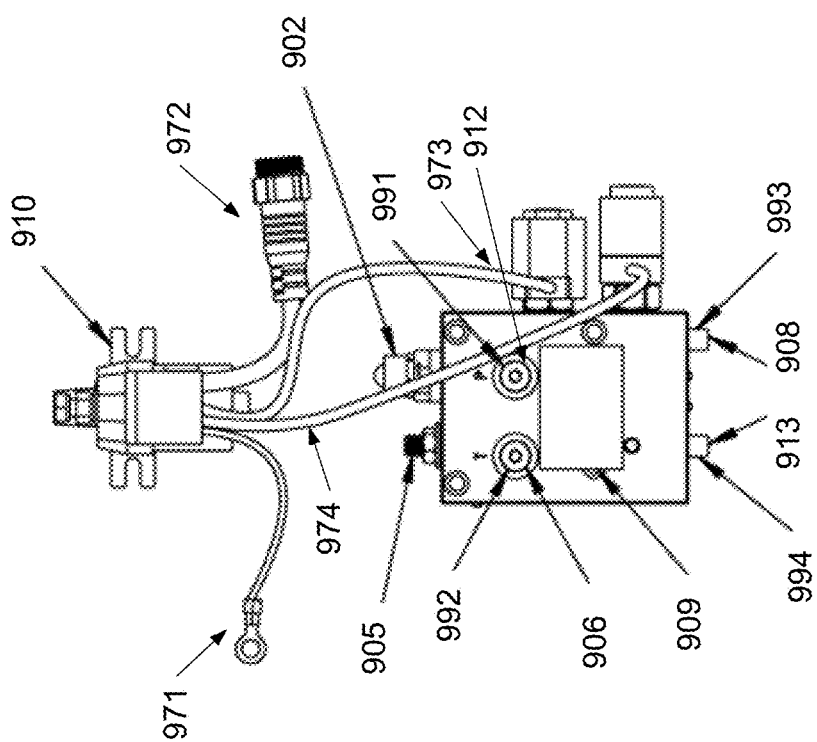
FIG. 9B is a schematic diagram illustrating a top view of a double-acting manifold assembly in accordance with an embodiment of the invention.

A schematic diagram illustrating a top view of a double-acting manifold assembly in accordance with an embodiment of the invention is shown in FIG. 9B. In various embodiments, the double-acting manifold 901 may also include a cartridge relief valve 902 and a relief valve assembly 905. In many embodiments, the double-acting manifold 901 may include a "P" port 991 for supplying high-pressure working fluid to an actuator of a hydraulic system and a "T" port 992 for returning working fluid from the actuator of the hydraulic system. In some embodiments, the P port 991 may include an O-ring plug 912 and the T port 992 may include an O-ring plug 906. In several embodiments, the double-acting manifold 901 may also include an A port 993 and a B port 994, as further described above. In some embodiments, the A port 993 may be covered with a cap plug 908 and the B port 994 may be covered with a cap plug 913. In some embodiments, the double-acting manifold 901 also may include a label 909 identifying a source of the manifold and/or SHPU and/or for providing any other information.

In reference to FIG. 9B, the double-acting manifold assembly may also include a start solenoid 910 connected to the double-acting manifold 901 via manifold connectors 973, 974, as further described below. In many embodiments, the start solenoid 910 may also include a power connector 971 for connecting to a power source (e.g., a negative terminal of a battery and/or ground), as described herein. In some embodiments, the start solenoid 910 may further include a controller connector 972 that may connect to an input device for receiving at least one command signal, as further described above.

Figure 9C:
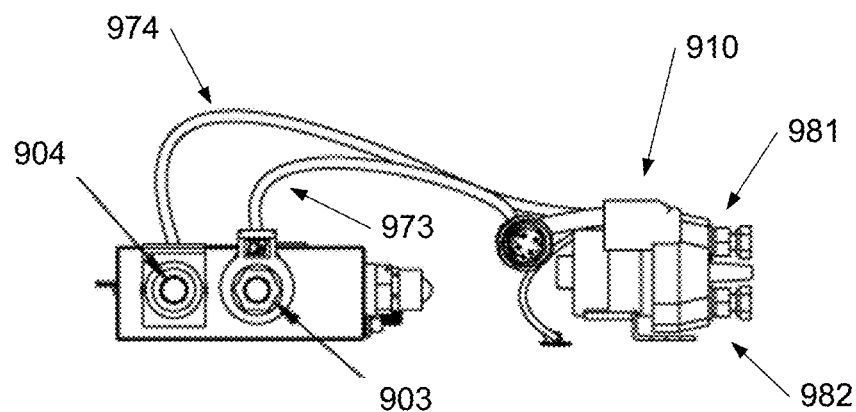
FIG. 9C is a schematic diagram illustrating a right side view of a double-acting manifold assembly in accordance with an embodiment of the invention.

A schematic diagram illustrating a right side view of a double-acting manifold assembly in accordance with an embodiment of the invention is shown in FIG. 9C. In some embodiments, the start solenoid 910 may also include a power connector 981. In various embodiments, the power connector 981 may connect to a power source (e.g., a positive terminal of a battery). Further, the double-acting manifold 901 may include a cartridge solenoid valve 903 (e.g., 4W2P spool type cartridge solenoid valve) and a 4-way cartridge valve 904 (e.g., a NC 2-way and P.O.C. in 4-way cartridge valve). In many embodiments, the start solenoid 910 may be connected to the cartridge solenoid valve 903 via a manifold connector 973 and connected to the 4-way cartridge valve 904 via a manifold connector 974.

Figure 9D:
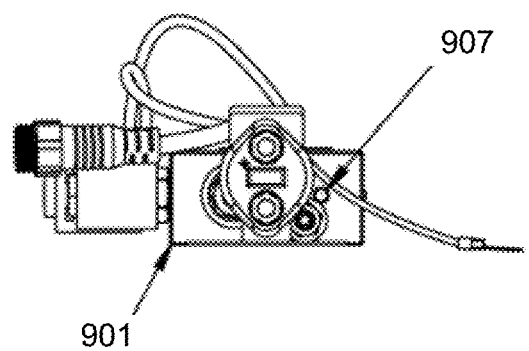
FIG. 9D is a schematic diagram illustrating a rear view of a double-acting manifold assembly in accordance with an embodiment of the invention.
Figure 9E:
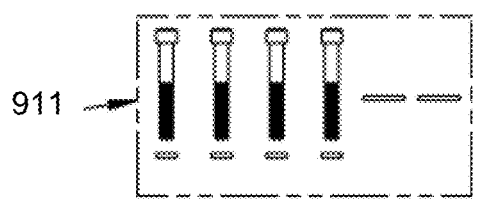
FIG. 9E is a schematic diagram illustrating a mounting assembly for a double-acting manifold assembly in accordance with an embodiment of the invention.

A schematic diagram illustrating a rear view of a double-acting manifold assembly in accordance with an embodiment of the invention is shown in FIG. 9D. In many embodiments, the double-acting manifold 901 may include one or more plugs 907. A schematic diagram illustrating a mounting assembly for a double-acting manifold assembly in accordance with an embodiment of the invention is shown in FIG. 9E. The mounting assembly 910 may include one or more securing mechanisms 951, 952, 953, 954 and/or one or more washers 950, as further described above.

Figure 10A:
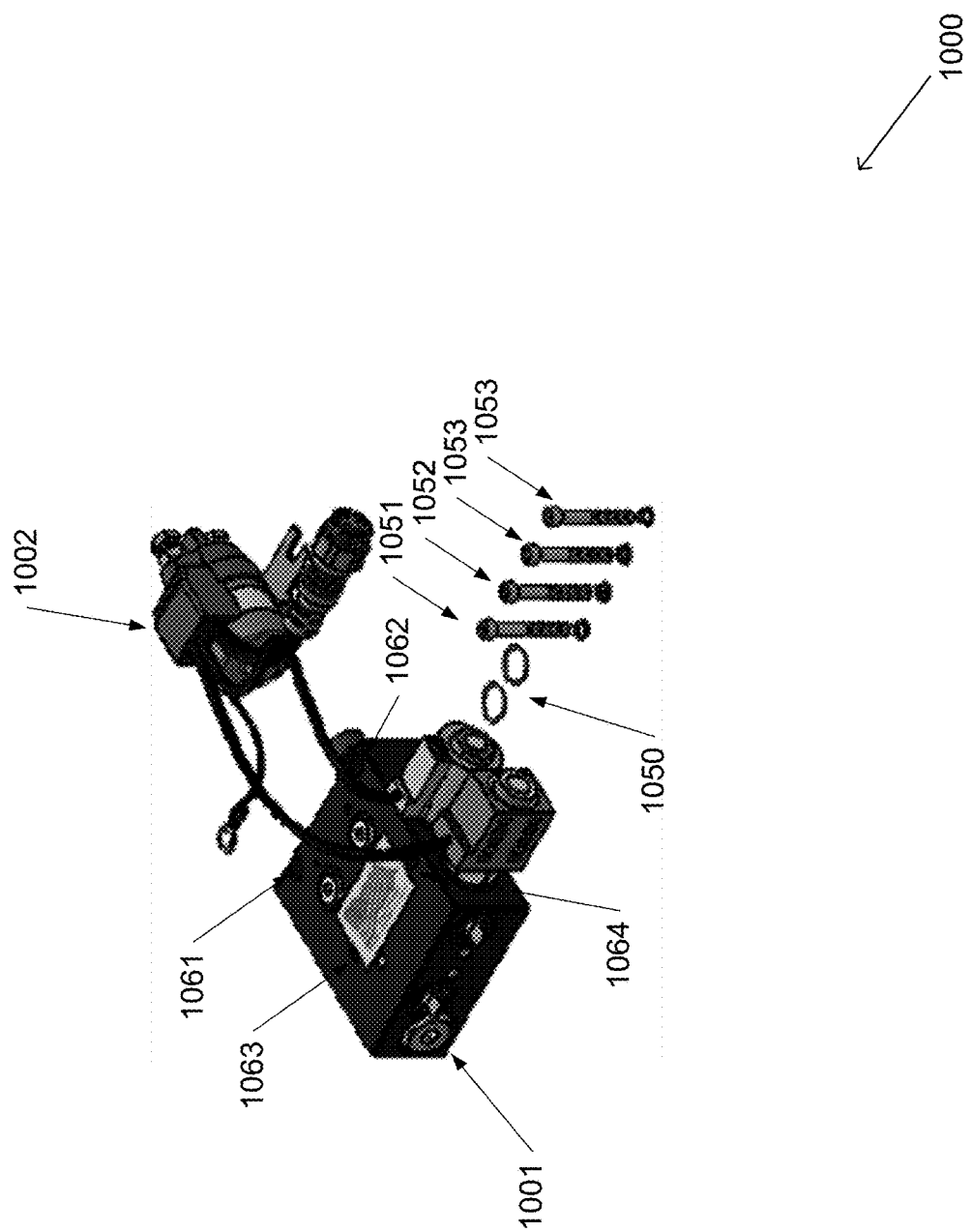
FIG. 10A is a front perspective view of a single/double-acting manifold assembly in accordance with an embodiment of the invention.

A front perspective view of a single/double-acting manifold assembly in accordance with an embodiment of the invention is shown in FIG. 10A. The single/double-acting manifold assembly 1000 may include a single/double-acting manifold 1001 that may be connected to a start solenoid 1002, as further described above. In many embodiments, the single/double-acting manifold 1001 may include one or more receiving holes (e.g., a first receiving hole 1061, a second receiving hole 1062, a third receiving hole 1063, a fourth receiving hole 1064, etc.) for receiving one or more securing mechanisms (e.g., a first screw and/or washer 1051, a second screw and/or washer 1052, a third screw and/or washer 1053, a fourth screw and/or washer 1054, etc.). In many embodiments, the single/double-acting manifold 1001 may be attached and/or detached from a lid 702 by securing the single/double-acting manifold 1001 to the lid 702 using the securing mechanisms 1051, 1052, 1053, 1054. For example, the single/double-acting manifold 1001 may be placed on the manifold receiving area 760 and secured by inserting a securing mechanism 1051, 1052, 1053, 1054 through a receiving hole 1061, 1062, 1063, 1064 and attaching the securing mechanism(s) 1051, 1052, 1053, 1054 to a manifold connection point(s) (e.g., the first manifold connection point 763, the second manifold connection point 764, etc.). In some embodiments, one or more washers (e.g., washers 1050) may be placed between the single/double-acting manifold 1001 and the lid 702 at the first and/or second manifold receiving openings 761, 762. The single/double-acting manifold 1001 may be detached, and interchanged, by releasing the securing mechanism(s) 1051, 1052, 1053, 1054 from the manifold connection point(s) (e.g., the first manifold connection point 763, the second manifold connection point 764, etc.).

Figure 10B:
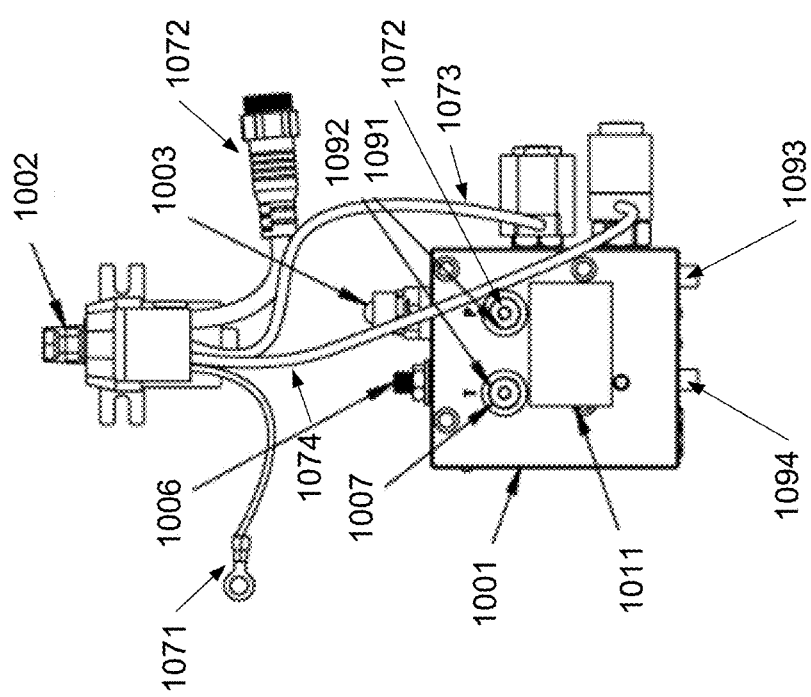
FIG. 10B is a schematic diagram illustrating a top view of a single/double-acting manifold assembly in accordance with an embodiment of the invention.

A schematic diagram illustrating a top view of a single/double-acting manifold assembly in accordance with an embodiment of the invention is shown in FIG. 10B. In various embodiments, the single/double-acting manifold 1001 may also include a cartridge relief valve 1003 and a relief valve assembly 1006. In many embodiments, the single/double-acting manifold 1001 may include a "P" port 1091 for supplying high-pressure working fluid to an actuator of a hydraulic system and a "T" port 1092 for returning working fluid from the actuator of the hydraulic system. In some embodiments, the P port 1091 may include an O-ring plug 1072 and the T port 1092 may include an O-ring plug 1007. In several embodiments, the single/double-acting manifold 1001 may also include an A port 1093 and a B port 1094, as further described above. In some embodiments, the A port 1093 and/or B port 1094 may be covered with cap plugs. In some embodiments, the single/double-acting manifold 1001 also may include a label 1011 identifying a source of the manifold and/or SHPU and/or for providing any other information.

In reference to FIG. 10B, the single/double-acting manifold assembly may also include a start solenoid 1002 connected to the single/double-acting manifold 1001 via manifold connectors 1073, 1074, as further described below. In many embodiments, the start solenoid 1002 may also include a power connector 1071 for connecting to a power source (e.g., a negative terminal of a battery and/or ground), as described herein. In some embodiments, the start solenoid 1002 may further include a controller connector 1072 that may connect to an input device for receiving at least one command signal, as further described above.

Figure 10C:
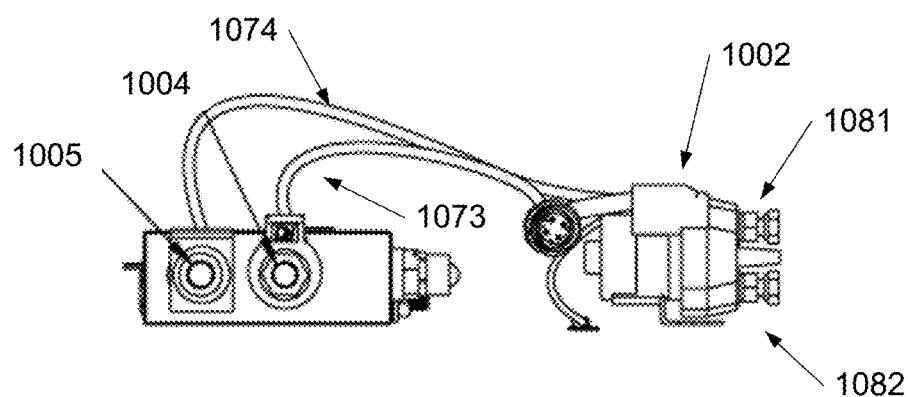
FIG. 10C is a schematic diagram illustrating a right side view of a single/double-acting manifold assembly in accordance with an embodiment of the invention.

A schematic diagram illustrating a right side view of a single/double-acting manifold assembly in accordance with an embodiment of the invention is shown in FIG. 10C. In some embodiments, the start solenoid 1002 may also include a power connector 1081. In various embodiments, the power connector 1081 may connect to a power source (e.g., a positive terminal of a battery). Further, the single/double-acting manifold 1001 may include a cartridge solenoid valve 1004 (e.g., 4W2P spool type cartridge solenoid valve) and a 4-way cartridge valve 1005 (e.g., a NC 2-way and P.O.C. in 4-way cartridge valve). In many embodiments, the start solenoid 1002 may be connected to the cartridge solenoid valve 1004 via a manifold connector 1073 and connected to the 4-way cartridge valve 1005 via a manifold connector 1074.

Figure 10D:
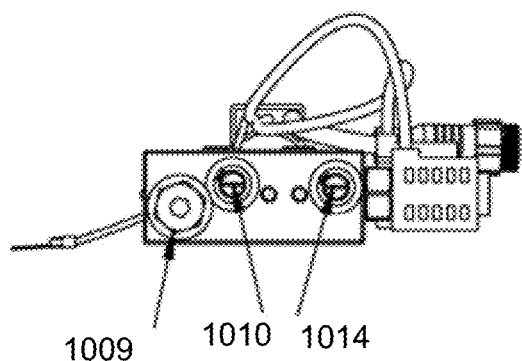
FIG. 10D is a schematic diagram illustrating a front view of a single/double-acting manifold assembly in accordance with an embodiment of the invention.

A schematic diagram illustrating a front view of a single/double-acting manifold assembly in accordance with an embodiment of the invention is shown in FIG. 10D. In various embodiments, the single/double-acting manifold 1001 may include a cartridge check valve 1009 (e.g., a direct-acting, ball-type cartridge check valve) and various plugs 1010, 1014 (e.g., tapered cap plugs).

Figure 10E:
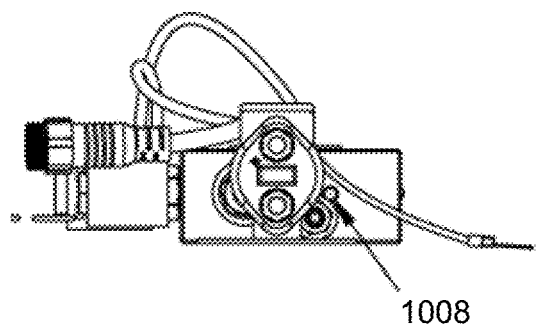
FIG. 10E is a schematic diagram illustrating a rear view of a single/double-acting manifold assembly in accordance with an embodiment of the invention.
Figure 10F:
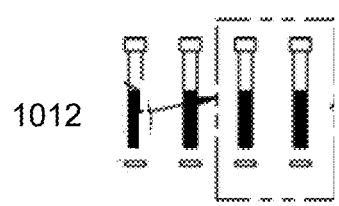
FIG. 10F is a schematic diagram illustrating a mounting assembly for a single/double-acting manifold assembly in accordance with an embodiment of the invention.

A schematic diagram illustrating a rear view of a single/double-acting manifold assembly in accordance with an embodiment of the invention is shown in FIG. 10E. In many embodiments, the single/double-acting manifold 1001 may include one or more plugs 1008. A schematic diagram illustrating a mounting assembly for a single/double-acting manifold assembly in accordance with an embodiment of the invention is shown in FIG. 10F. The mounting assembly 1012 may include one or more securing mechanisms 1051, 1052, 1053, 1054 and/or one or more washers 1050, as further described above.

Figure 11A:
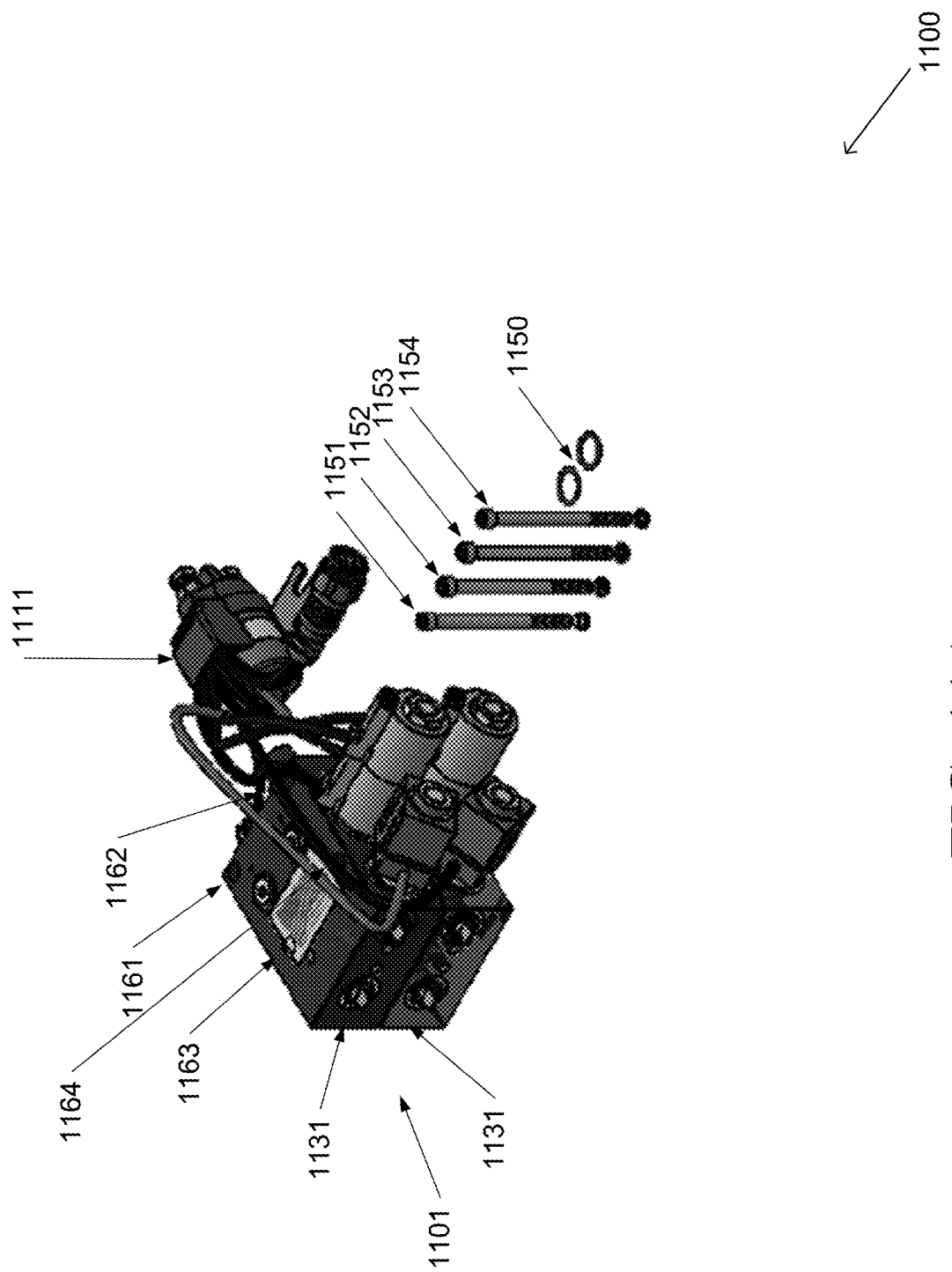
FIG. 11A is a front perspective view of a double double-acting manifold assembly in accordance with an embodiment of the invention.

A front perspective view of a double double-acting manifold assembly in accordance with an embodiment of the invention is shown in FIG. 11A. The double double-acting manifold assembly 1100 may include a double double-acting manifold 1101 that may be connected to a start solenoid 1111, as further described above. In some embodiments, the double double-acting manifold 1101 may include a first double-acting manifold 1131 and a second double-acting manifold 1132. In many embodiments, the double double-acting manifold 1101 may include one or more receiving holes (e.g., a first receiving hole 1161, a second receiving hole 1162, a third receiving hole 1163, a fourth receiving hole 1164, etc.) for receiving one or more securing mechanisms (e.g., a first screw and/or washer 1151, a second screw and/or washer 1152, a third screw and/or washer 1153, a fourth screw and/or washer 1154, etc.). In many embodiments, the double double-acting manifold 1101 may be attached and/or detached from a lid 702 by securing the double double-acting manifold 1101 to the lid 702 using the securing mechanisms 1151, 1152, 1153, 1154. For example, the double double-acting manifold 1101 may be placed on the manifold receiving area 760 and secured by inserting a securing mechanism 1151, 1152, 1153, 1154 through a receiving hole 1161, 1162, 1163, 1164 and attaching the securing mechanism(s) 1151, 1152, 1153, 1154 to a manifold connection point(s) (e.g., the first manifold connection point 763, the second manifold connection point 764, etc.). In some embodiments, one or more washers (e.g., washers 1150) may be placed between the double double-acting manifold 1101 and the lid 702 at the first and/or second manifold receiving openings 761, 762. The double double-acting manifold 1101 may be detached, and interchanged, by releasing the securing mechanism(s) 1151, 1152, 1153, 1154 from the manifold connection point(s) (e.g., the first manifold connection point 763, the second manifold connection point 764, etc.).

Figure 11B:
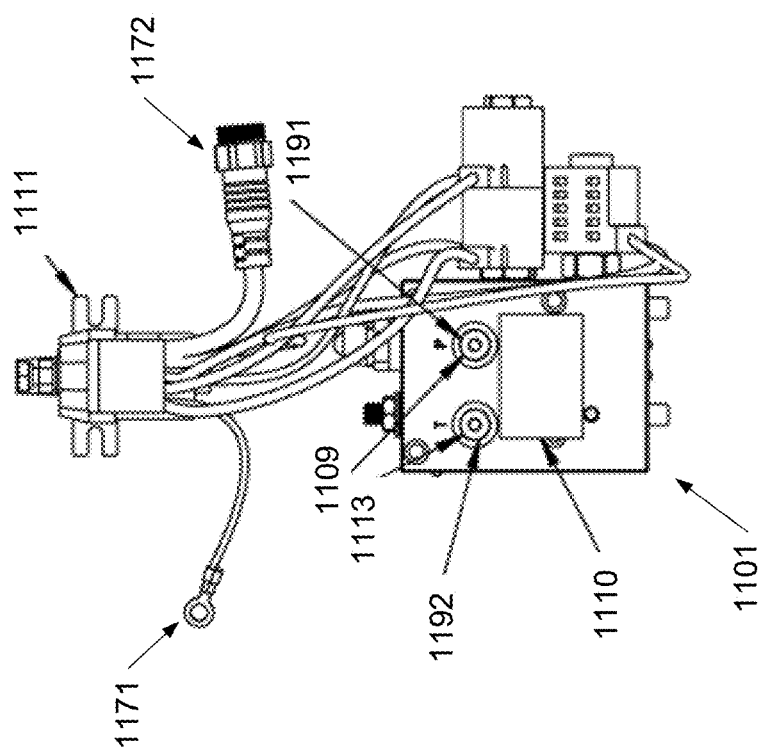
FIG. 11B is a schematic diagram illustrating a top view of a double double-acting manifold assembly in accordance with an embodiment of the invention.

A schematic diagram illustrating a top view of a double double-acting manifold assembly in accordance with an embodiment of the invention is shown in FIG. 11B. In many embodiments, the double double-acting manifold 1101 may include a "P" port 1191 for supplying high-pressure working fluid to an actuator of a hydraulic system and a "T" port 1192 for returning working fluid from the actuator of the hydraulic system. In some embodiments, the P port 1191 may include an O-ring plug 1109 and the T port 1192 may include an O-ring plug 1113. In some embodiments, the double double-acting manifold 1101 also may include a label 1110 identifying a source of the manifold and/or SHPU and/or for providing any other information.

In reference to FIG. 11B, the double double-acting manifold assembly may also include a start solenoid 1111 connected to the double double-acting manifold 1101 via manifold connectors 1173, 1174, 1175, 1176, 1177, 1178, as further described below. In many embodiments, the start solenoid 1111 may also include a power connector 1171 for connecting to a power source (e.g., a negative terminal of a battery and/or ground), as described herein. In some embodiments, the start solenoid 1111 may further include a controller connector 1172 that may connect to an input device for receiving at least one command signal, as further described above.

Figure 11C:
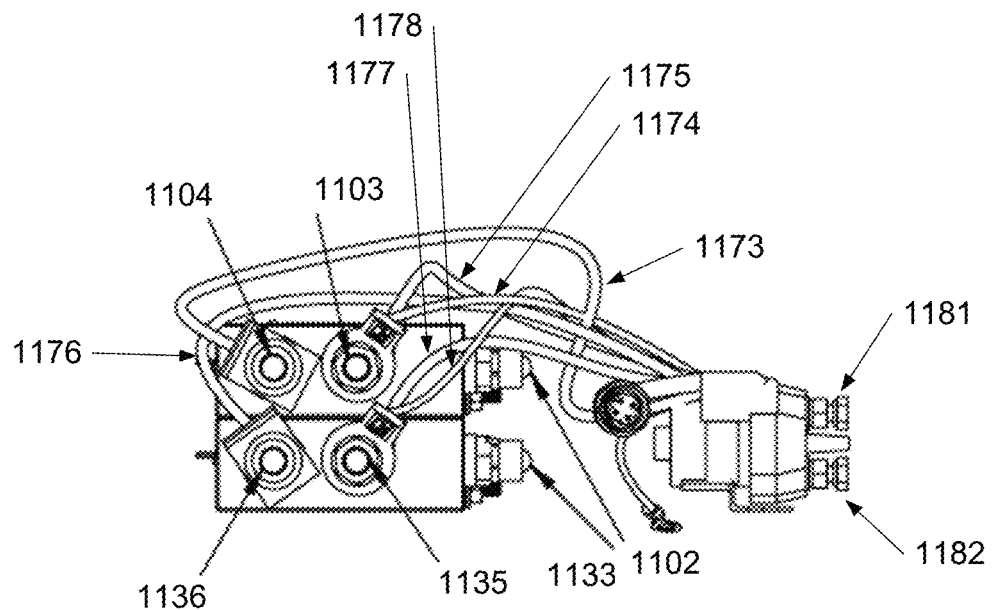
FIG. 11C is a schematic diagram illustrating a right side view of a double double-acting manifold assembly in accordance with an embodiment of the invention.

A schematic diagram illustrating a right side view of a double double-acting manifold assembly in accordance with an embodiment of the invention is shown in FIG. 11C. In some embodiments, the start solenoid 1111 may also include a power connector 1181. In various embodiments, the power connector 1181 may connect to a power source (e.g., a positive terminal of a battery). In various embodiments, the double double-acting manifold 1101 may also include one or more cartridge relief valves 1102, 1133 and one or more relief valve assemblies 1105, 1134, as further described below. Further, the double double-acting manifold 1101 may include cartridge solenoid valves 1103, 1135 (e.g., 4W2P motor center, spool type cartridge solenoid valves) and 4-way cartridge valves 1104, 1136 (e.g., a NC 2-way and P.O.C. in 4-way cartridge valves). In many embodiments, the start solenoid 1111 may be connected to the cartridge solenoid valve 1103 via manifold connectors 1174, 1175, connected to to the cartridge solenoid valve 1135 via manifold connectors 1177, 1178, connected to the 4-way cartridge valve 1104 via a manifold connector 1173, and connected to the 4-way cartridge valve 1136 via a manifold connector 1176.

Figure 11D:
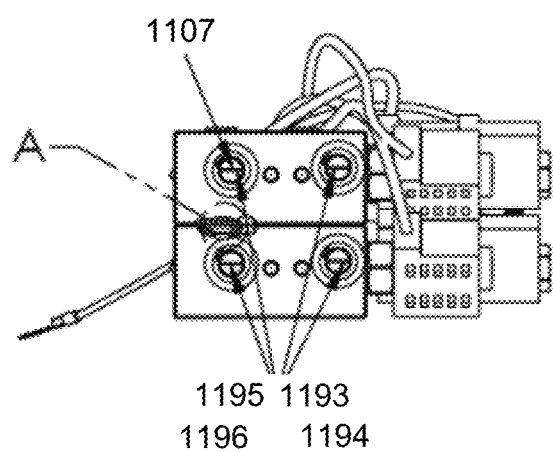
FIG. 11D is a schematic diagram illustrating a front view of a double double-acting manifold assembly in accordance with an embodiment of the invention.

A schematic diagram illustrating a front view of a double double-acting manifold assembly in accordance with an embodiment of the invention is shown in FIG. 11D. In various embodiments, the double double-acting manifold 1101 may include various plugs (e.g., tapered cap plug 1107). In addition, the double double-acting manifold 1101 may include A ports 1193, 1194 and B ports 1195, 1196, as further described above. In some embodiments, the A ports 1193, 1194 and/or B ports 1195, 1196 may be covered with cap plugs.

Figure 11E:
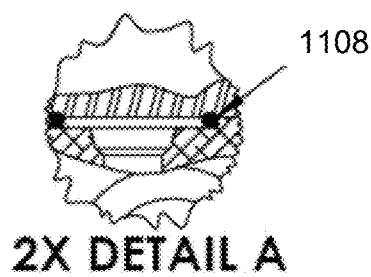
FIG. 11E is a schematic diagram illustrating a close up of Detail A in FIG. 11D in accordance with an embodiment of the invention.

A schematic diagram illustrating a close up of Detail A in FIG. 11D in accordance with an embodiment of the invention is shown in FIG. 11E. In many embodiments, the double double-acting manifold 1101 may include a first double-acting manifold 1131 connected to a second double-acting manifold 1132 using one or more O-rings 1108.

Figure 11F:
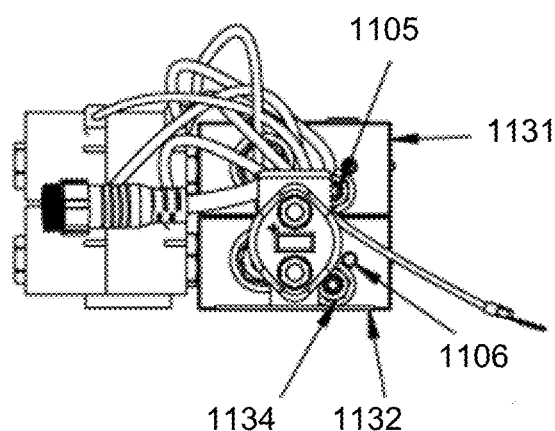
FIG. 11F is a schematic diagram illustrating a rear view of a double double-acting manifold assembly in accordance with an embodiment of the invention.
Figure 11G:
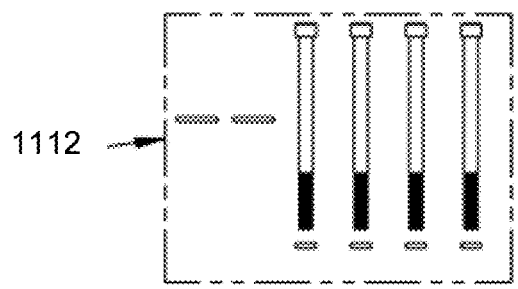
FIG. 11G is a schematic diagram illustrating a mounting assembly for a double double-acting manifold assembly in accordance with an embodiment of the invention.

A schematic diagram illustrating a rear view of a double double-acting manifold assembly in accordance with an embodiment of the invention is shown in FIG. 11F. In some embodiments, the double double-acting manifold 1101, comprising the first double-acting manifold 1131 and the second double-acting manifold 1132, may include one or more relief valve assemblies 1105, 1134. In some embodiments, the double double-acting manifold 1101 may also include one or more plugs 1106. A schematic diagram illustrating a mounting assembly for a double double-acting manifold assembly in accordance with an embodiment of the invention is shown in FIG. 11G. The mounting assembly 1112 may include one or more securing mechanisms 1151, 1152, 1153, 1154 and/or one or more washers 1150, as further described above.

Figure 12A:
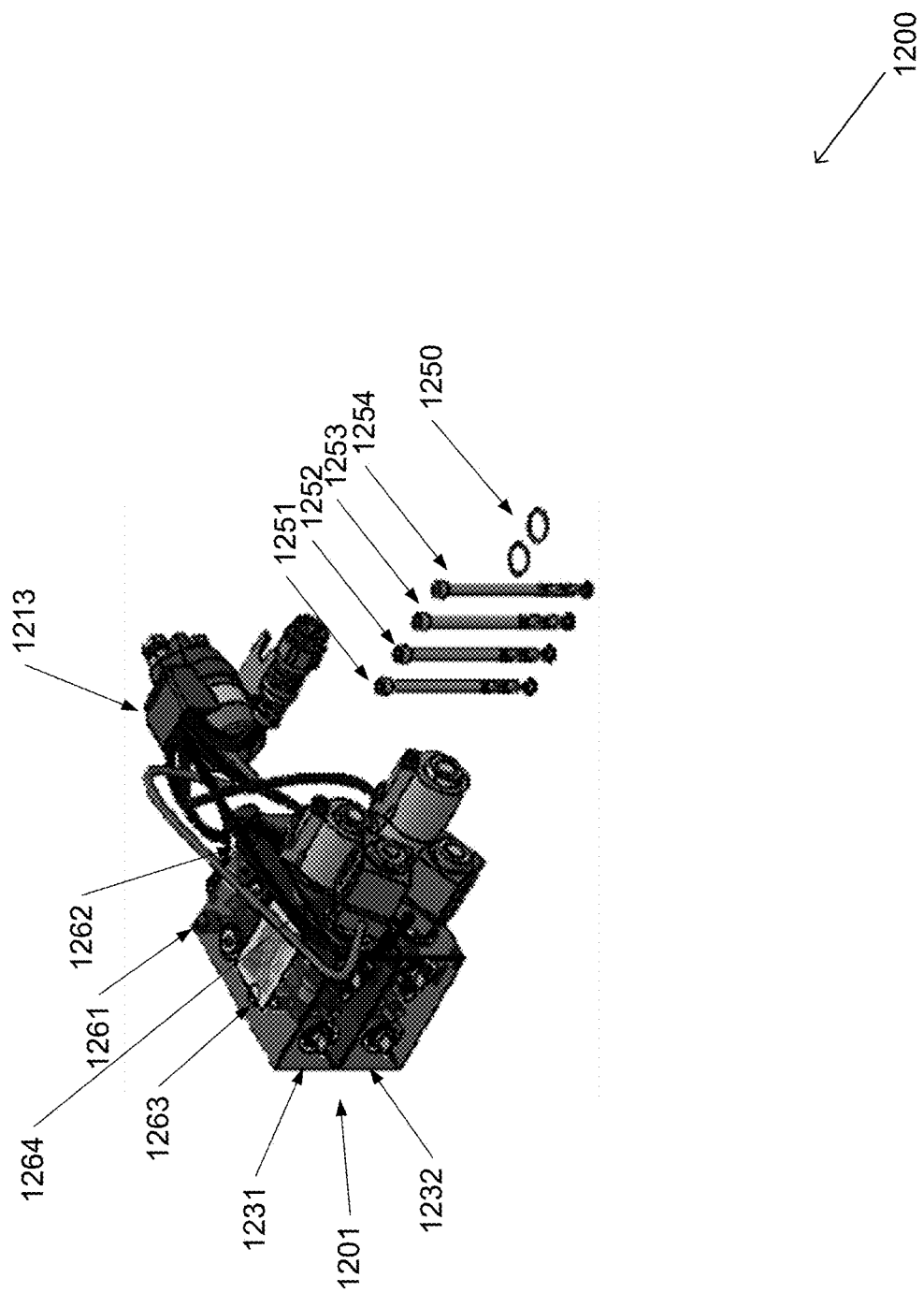
FIG. 12A is a front perspective view of a double single-acting manifold assembly in accordance with an embodiment of the invention.

A front perspective view of a double single-acting manifold assembly in accordance with an embodiment of the invention is shown in FIG. 12A. The double single-acting manifold assembly 1200 may include a double single-acting manifold 1201 that may be connected to a start solenoid 1213, as further described above. In some embodiments, the double single-acting manifold 1201 may include a first double-acting manifold 1231 and a second double-acting manifold 1232. In many embodiments, the double single-acting manifold 1201 may include one or more receiving holes (e.g., a first receiving hole 1261, a second receiving hole 1262, a third receiving hole 1263, a fourth receiving hole 1264, etc.) for receiving one or more securing mechanisms (e.g., a first screw and/or washer 1251, a second screw and/or washer 1252, a third screw and/or washer 1253, a fourth screw and/or washer 1254, etc.). In many embodiments, the double single-acting manifold 1201 may be attached and/or detached from a lid 702 by securing the double single-acting manifold 1201 to the lid 702 using the securing mechanisms 1251, 1252, 1253, 1254. For example, the double single-acting manifold 1201 may be placed on the manifold receiving area 760 and secured by inserting a securing mechanism 1251, 1252, 1253, 1254 through a receiving hole 1261, 1262, 1263, 1264 and attaching the securing mechanism(s) 1251, 1252, 1253, 1254 to a manifold connection point(s) (e.g., the first manifold connection point 763, the second manifold connection point 764, etc.). In some embodiments, one or more washers (e.g., washers 1250) may be placed between the double single-acting manifold 1201 and the lid 702 at the first and/or second manifold receiving openings 761, 762. The double single-acting manifold 1201 may be detached, and interchanged, by releasing the securing mechanism(s) 1251, 1252, 1253, 1254 from the manifold connection point(s) (e.g., the first manifold connection point 763, the second manifold connection point 764, etc.).

Figure 12B:
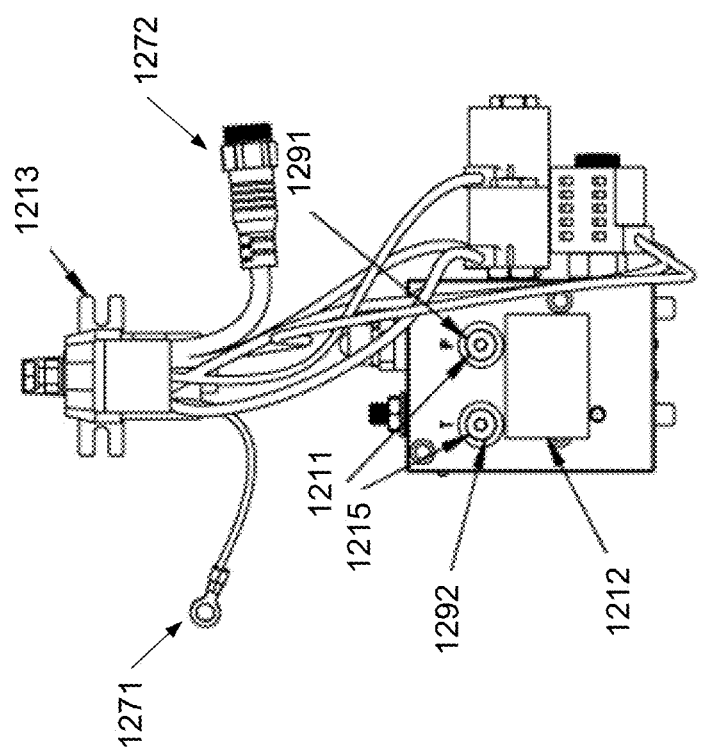
FIG. 12B is a schematic diagram illustrating a top view of a double single-acting manifold assembly in accordance with an embodiment of the invention.

A schematic diagram illustrating a top view of a double single-acting manifold assembly in accordance with an embodiment of the invention is shown in FIG. 12B. In many embodiments, the double single-acting manifold 1201 may include a "P" port 1291 for supplying high-pressure working fluid to an actuator of a hydraulic system and a "T" port 1292 for returning working fluid from the actuator of the hydraulic system. In some embodiments, the P port 1291 may include an O-ring plug 1211 and the T port 1292 may include an O-ring plug 1215. In some embodiments, the double single-acting manifold 1201 also may include a label 1212 identifying a source of the manifold and/or SHPU and/or for providing any other information.

In reference to FIG. 12B, the double single-acting manifold assembly may also include a start solenoid 1213 connected to the double single-acting manifold 1201 via manifold connectors 1273, 1274, 1275, 1276, 1277, 1278, as further described below. In many embodiments, the start solenoid 1213 may also include a power connector 1271 for connecting to a power source (e.g., a negative terminal of a battery and/or ground), as described herein. In some embodiments, the start solenoid 1213 may further include a controller connector 1272 that may connect to an input device for receiving at least one command signal, as further described above.

Figure 12C:
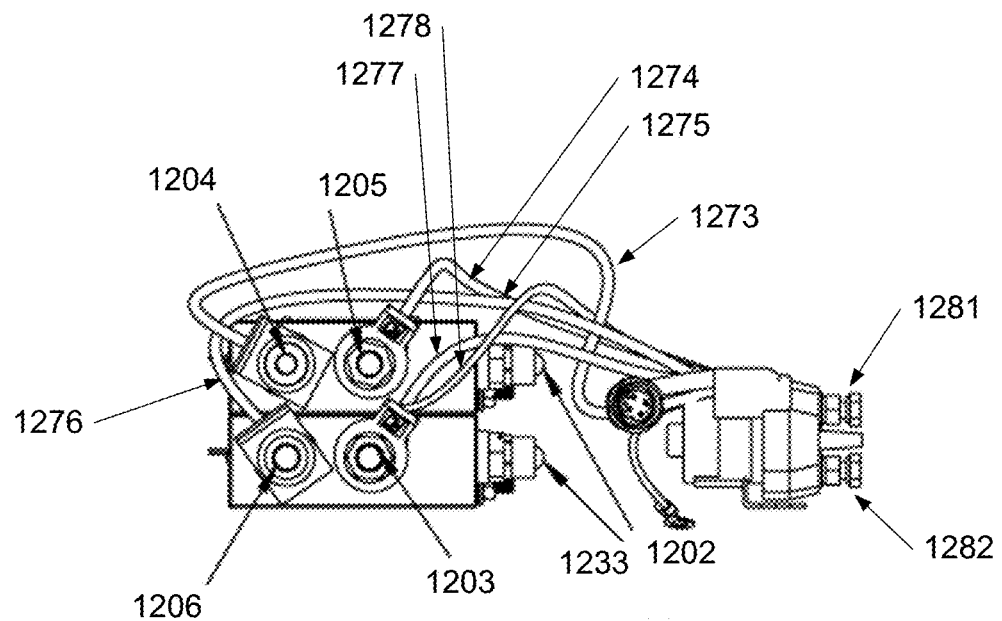
FIG. 12C is a schematic diagram illustrating a right side view of a double single-acting manifold assembly in accordance with an embodiment of the invention.

A schematic diagram illustrating a right side view of a double single-acting manifold assembly in accordance with an embodiment of the invention is shown in FIG. 12C. In some embodiments, the start solenoid 1213 may also include a power connector 1281. In various embodiments, the power connector 1281 may connect to a power source (e.g., a positive terminal of a battery). In various embodiments, the double single-acting manifold 1201 may also include cartridge relief valves 1202, 1233. Further, the double single-acting manifold 1101 may include a cartridge solenoid valve 1203, a 2-way valve 1204, a cartridge solenoid valve 1205 (e.g., a 4W2P spool type cartridge solenoid valve), and a 4-way cartridge valve 1206 (e.g., a NC 2-way and P.O.C. in 4-way cartridge valve). In many embodiments, the start solenoid 1213 may be connected to the cartridge solenoid valve 1205 via manifold connectors 1274, 1275, connected to the cartridge solenoid valve 1203 via manifold connectors 1277, 1278, connected to the 2-way valve 1204 via a manifold connector 1273, and connected to the 4-way cartridge valve 1206 via a manifold connector 1276.

Figure 12D:
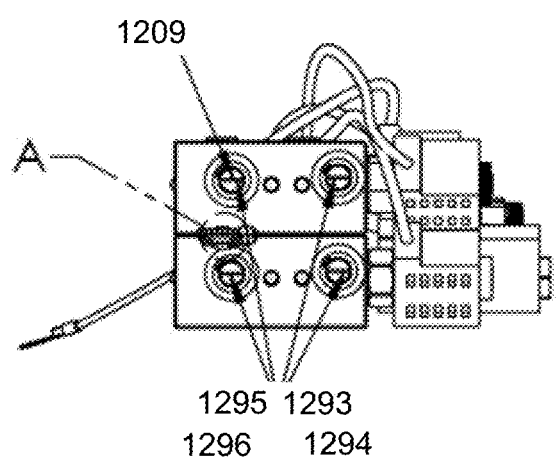
FIG. 12D is a schematic diagram illustrating a front view of a double single-acting manifold assembly in accordance with an embodiment of the invention.

A schematic diagram illustrating a front view of a double single-acting manifold assembly in accordance with an embodiment of the invention is shown in FIG. 12D. In various embodiments, the double single-acting manifold 1201 may include various plugs (e.g., tapered cap plug 1209). In addition, the double single-acting manifold 1201 may include A ports 1293, 1294 and B ports 1295, 1296, as further described above. In some embodiments, the A ports 1293, 1294 and/or B ports 1295, 1296 may be covered with cap plugs.

Figure 12E:
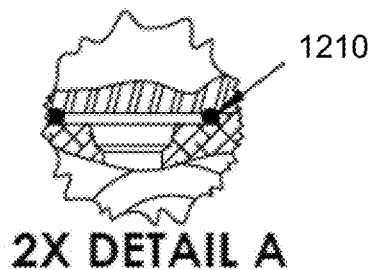
FIG. 12E is a schematic diagram illustrating a close up of Detail A in FIG. 12D in accordance with an embodiment of the invention.

A schematic diagram illustrating a close up of Detail A in FIG. 12D in accordance with an embodiment of the invention is shown in FIG. 12E. In many embodiments, the double single-acting manifold 1201 may include a first double-acting manifold 1231 connected to a second double-acting manifold 1232 using one or more O-rings 1210.

Figure 12F:
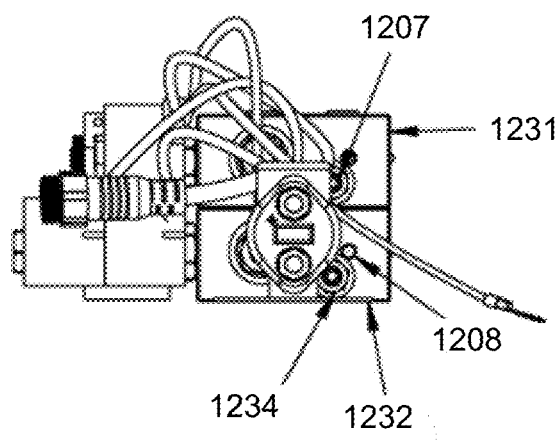
FIG. 12F is a schematic diagram illustrating a rear view of a double single-acting manifold assembly in accordance with an embodiment of the invention.
Figure 12G:
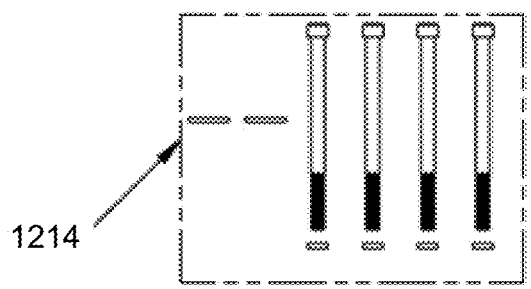
FIG. 12G is a schematic diagram illustrating a mounting assembly for a double single-acting manifold assembly in accordance with an embodiment of the invention.

A schematic diagram illustrating a rear view of a double single-acting manifold assembly in accordance with an embodiment of the invention is shown in FIG. 12F. In some embodiments, the double single-acting manifold 1201, comprising the first double-acting manifold 1231 and the second double-acting manifold 1232, may include one or more relief valve assemblies 1207, 1234. In some embodiments, the double single-acting manifold 1201 may also include one or more plugs 1208. A schematic diagram illustrating a mounting assembly for a double single-acting manifold assembly in accordance with an embodiment of the invention is shown in FIG. 12G. The mounting assembly 1214 may include one or more securing mechanisms 1251, 1252, 1253, 1254 and/or one or more washers 1250, as further described above.

Although interchangeable manifold assemblies for SHPUs are discussed above with respect to FIGS. 8A-12G, any of a variety of interchangeable manifold assemblies for various hydraulic systems as appropriate to the requirements of a specific application can be utilized in accordance with embodiments of the invention. Further, although various components (e.g., manifolds, start solenoids, valves, ports, etc.) are discussed above with respect to FIGS. 8A-12G, any of a variety of components as appropriate to the requirements of a specific application can be utilized in accordance with embodiments of the invention. For example, various components discussed above with respect to FIGS. 8A-12G could be interchanged as appropriate to the requirements of a specific application in accordance with embodiments of the invention. Further, although specific manifolds are discussed above with respect to FIGS. 8A-12G, any manifold as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A submersible hydraulic power unit for moving hydraulic fluid between a first chamber and a second chamber of a hydraulic device, the submersible hydraulic power unit comprising:
    a tank for storing hydraulic fluid, wherein the tank houses:
        a motor submerged in the hydraulic fluid, the motor having a powered on and a powered off configuration based on at least one command signal; and
        a pump submerged in the hydraulic fluid and connected to the motor, wherein the motor drives the pump to route the hydraulic fluid in and out of the tank; and
    a lid attached to the tank, wherein the lid comprises:
        at least one opening allowing a start solenoid to connect to the motor; and
        at least one opening allowing an interchangeable manifold to connect to the pump wherein the interchangeable manifold is exterior to the tank.

2. The submersible hydraulic power unit of claim 1, wherein the lid further comprises at least one manifold connection point for attaching the interchangeable manifold to the lid.

3. The submersible hydraulic power unit of claim 1, wherein the start solenoid is exterior to the tank.

4. The submersible hydraulic power unit of claim 3, wherein the start solenoid is connected to the interchangeable manifold.

5. The submersible hydraulic power unit of claim 4, wherein the start solenoid is connected to a power source.

6. The submersible hydraulic power unit of claim 5, wherein the start solenoid is connected to an input device for receiving the at least one command signal.

7. The submersible hydraulic power unit of claim 6, wherein the input device is wirelessly connected to the SHPU.

8. The submersible hydraulic power unit of claim 1, wherein the motor is connected to a power source exterior to the tank.

9. The submersible hydraulic power unit of claim 1, wherein the motor is a direct current motor.

10. The submersible hydraulic power unit of claim 1, wherein the motor is an alternating current motor.

11. The submersible hydraulic power unit of claim 1, wherein the hydraulic fluid absorbs waste heat produced by the motor.

12. The submersible hydraulic power unit of claim 1, wherein the hydraulic fluid absorbs noise produced by the motor.

13. The submersible hydraulic power unit of claim 1, wherein the lid is removable from the tank.

14. The submersible hydraulic power unit of claim 1, wherein the interchangeable manifold is a single-acting manifold.

* * * * *